US012741636B2

(12) United States Patent
Puphal et al.

(10) Patent No.: US 12,741,636 B2

(45) Date of Patent: Sep. 22, 2026

(54) ASSISTANCE SYSTEM AND COMPUTER-IMPLEMENTED METHOD USING PREDICTION WITH HUMAN FACTORS

(71) Applicant: Honda Motor Co., Ltd., Tokyo (JP)

(72) Inventors: Tim Puphal, Offenbach (DE); Matti Krüger, Offenbach (DE)

(73) Assignee: Honda Motor Co., Ltd., Tokyo (JP)

( * ) Notice: Subject to any disclaimer, the term of this patent is extended or adjusted under 35 U.S.C. 154(b) by 243 days.

(21) Appl. No.: 18/499,196

(22) Filed: Oct. 31, 2023

(65) Prior Publication Data

US 2025/0136103 A1 May 1, 2025

(51) Int. Cl.
*B60W 30/095* (2012.01)

(52) U.S. Cl.
CPC . *B60W 30/0956* (2013.01); *B60W 2554/4026* (2020.02); *B60W 2554/4029* (2020.02);
(Continued)

(58) Field of Classification Search
CPC ..... B60W 30/0956; B60W 2554/4026; B60W 2554/4029; B60W 2554/4042; B60W 2556/45; B60W 2554/4045; B60W 2554/4047; B60W 2554/4049; B60W 30/12; B60W 30/16; B60W 30/162; B60W 30/165; B60W 30/17; B60W 30/182; B60W 50/082; B60W 2554/4043; B60W 2554/4046; B60K 28/00–165;
(Continued)

(56) References Cited

U.S. PATENT DOCUMENTS 8,344,894 B2 1/2013 Szczerba et al.
8,457,827 B1 * 6/2013 Ferguson ........ B60W 60/00276 701/28

(Continued)

FOREIGN PATENT DOCUMENTS

DE 112020001649 4/2022
EP 1544070 3/2016

(Continued)

OTHER PUBLICATIONS

"Notice of Reasons for Refusal of Japan Counterpart Application", issued on Nov. 25, 2025, with English translation thereof, p. 1-p. 9.

*Primary Examiner* — Manglesh M Patel
(74) *Attorney, Agent, or Firm* — JCIPRNET

(57) ABSTRACT

A computer-implemented method for assisting an agent moving in a dynamic environment, in which at least one other agent is present, comprises: obtaining sensor information on the environment of the agent; predicting at least one behavior of at least one of the agent or the at least one other agent based on the obtained sensor information; determining at least one human factor relevant for the predicted at least one behavior; adapting the predicted at least one behavior based on the determined human factor; determining whether a communication based on the adapted at least one behavior is beneficial to the agent or an overall traffic objective, e.g., safety; and generating a signal based on the adapted at least one behavior in case of determining that the communication is beneficial, and outputting the generated signal to the agent.

24 Claims, 10 Drawing Sheets

(52) U.S. Cl.
CPC ............... *B60W 2554/4042* (2020.02); *B60W 2554/4045* (2020.02); *B60W 2554/4047* (2020.02); *B60W 2556/45* (2020.02)

(58) Field of Classification Search
CPC .... G05D 1/0061; G05D 1/0088; G05D 1/021; G05D 1/0214; G05D 1/0221; G05D 1/0223
USPC ........................................................... 701/23
See application file for complete search history.

(56) References Cited

U.S. PATENT DOCUMENTS

| | | | | |
|---|---|---|---|---|
| 8,519,853 | B2 | 8/2013 | Eskandarian et al. | |
| 8,903,588 | B2 | 12/2014 | Schmudderich et al. | |
| 9,308,919 | B2 | 4/2016 | Schmüdderich | |
| 9,340,213 | B2 | 5/2016 | Kollegger et al. | |
| 9,457,814 | B2 | 10/2016 | Kim et al. | |
| 9,620,008 | B2 | 4/2017 | Schmüdderich et al. | |
| 9,650,041 | B2 | 5/2017 | Feit et al. | |
| 9,878,710 | B2 * | 1/2018 | Schmüdderich | G06V 20/52 |
| 9,969,388 | B2 | 5/2018 | Schmüdderich | |
| 10,357,195 | B2 | 7/2019 | Beck et al. | |
| 10,625,776 | B2 | 4/2020 | Rebhan et al. | |
| 10,836,390 | B2 | 11/2020 | Tahmasbi-Sarvestani | |
| 10,915,770 | B2 * | 2/2021 | Heckmann | G08G 1/167 |
| 10,992,755 | B1 | 4/2021 | Tran | |
| 11,216,888 | B2 | 1/2022 | Perl et al. | |
| 12,194,989 | B2 * | 1/2025 | Itoh | B60W 30/09 |
| 2005/0110348 | A1 | 5/2005 | Hijikata et al. | |
| 2008/0195281 | A1 | 8/2008 | Norris et al. | |
| 2013/0325202 | A1 | 12/2013 | Howard et al. | |
| 2014/0236386 | A1 * | 8/2014 | Yoshizawa | G08G 1/166 701/1 |
| 2016/0001781 | A1 | 1/2016 | Fung et al. | |
| 2017/0057497 | A1 * | 3/2017 | Laur | B60W 30/09 |
| 2018/0086336 | A1 * | 3/2018 | Jones | B60W 10/04 |
| 2018/0231974 | A1 * | 8/2018 | Eggert | B60W 30/085 |
| 2019/0221118 | A1 * | 7/2019 | Kume | G08G 1/161 |
| 2020/0231149 | A1 | 7/2020 | Eggert et al. | |
| 2020/0249677 | A1 * | 8/2020 | Maat | B60W 60/001 |
| 2020/0307615 | A1 * | 10/2020 | Suzuki | B60K 35/28 |
| 2021/0387653 | A1 * | 12/2021 | He | B60W 30/0953 |
| 2022/0012995 | A1 | 1/2022 | Oboril et al. | |
| 2022/0095975 | A1 | 3/2022 | Aluf et al. | |
| 2022/0316897 | A1 | 10/2022 | Eggert et al. | |
| 2022/0363258 | A1 * | 11/2022 | Voigt | B60W 30/12 |
| 2022/0388518 | A1 | 12/2022 | Oba | |
| 2023/0048304 | A1 * | 2/2023 | Nooteboom | B60W 50/06 |
| 2023/0098344 | A1 * | 3/2023 | Voigt | B60W 30/09 701/41 |
| 2025/0074445 | A1 * | 3/2025 | Xu | B60W 30/095 |
| 2025/0148725 | A1 * | 5/2025 | Urtasun | G06N 3/094 |
| 2025/0333053 | A1 * | 10/2025 | Oishi | B60W 30/09 |
| 2026/0028022 | A1 * | 1/2026 | Xu | B60W 30/143 |
| 2026/0028044 | A1 * | 1/2026 | Johnson | B60W 60/0011 |

FOREIGN PATENT DOCUMENTS

| | | |
|---|---|---|
| EP | 2840007 | 4/2018 |
| EP | 2845779 | 8/2018 |
| JP | H07262498 | 10/1995 |
| JP | 2020154795 | 9/2020 |

* cited by examiner

ASSISTANCE SYSTEM AND COMPUTER-IMPLEMENTED METHOD USING PREDICTION WITH HUMAN FACTORS

TECHNICAL FIELD OF THE DISCLOSURE

The disclosure relates to the general field of assistance systems in a dynamic environment, which base on prediction of future behaviors of mobile agents. In particular, a computer-implemented method for assisting an agent operating in the dynamic environment is proposed.

TECHNICAL BACKGROUND

The field of automated driver assistance in a road traffic environment represents a particular application area, in which a mobile agent moves with support of an assistance system in a highly dynamic environment with a plurality of other mobile agents.

Agents may be traffic participants including, but not limited to, pedestrians, cyclists, motorcyclists, motor vehicles, e.g. cars trucks and busses in a traffic scenario in the road traffic environment.

Alternative examples for agents moving in dynamically changing scenarios include air vehicles, e.g., manned aircraft, helicopters, unmanned aerial vehicles moving in an airspace environment or sea vehicles in a maritime environment.

Current advanced driver assistance systems in a road traffic environment use prediction of a future behavior of other vehicles in the environment of a vehicle (ego-vehicle), which operates autonomously with support by the driver assistance system. In U.S. Pat. No. 8,903,588 B2, e.g., the disclosed driving assistance system predicts future movement behaviors of a target object based on sensor data acquired by at least one sensor physically sensing the environment of the ego-vehicle. The system computes a plurality of movement behavior alternatives of an agent in the environment of the ego-vehicle sensed by the sensors. In a context based prediction step, the system uses a set of classifiers, each classifier estimating a probability that said sensed agent will execute a movement behavior at a time. The system validates the movement behavior alternatives using a physical prediction comparing measured points with trajectories of situation models and determines at least one trajectory indicating at least one future behavior of the agent. The system, estimates at least one future position of the agent based on the determined at least one trajectory, and may output information representing the estimated future position as basis for performing a driving actuation of the ego-vehicle in autonomous driving or a supporting a driver of the ego-vehicle by outputting a signal, e.g. a warning signal.

Driver assistance systems may include an adaptive cruise control system (ACC), which perform a longitudinal control of the ego-vehicle based on a velocity set by a driver of the ego-vehicle and sensed distances from the ego-vehicle to other vehicles and the respective velocities of the other vehicles.

Nevertheless, known ACC systems lack the capability to cope with different driver personalities in a road traffic environment that in particular human drivers operating a variety of vehicles or persons moving on foot still dominate. Concerning the ACC, human drivers may act differently depending on their personal traits and mental states, they react early or react late to a changing situation. Human drivers may perform actions as sudden lane changes cutting in or cutting out in front of an ego-vehicle, and thereby change suddenly a safety distance between the ego-vehicle and the other vehicles.

Generally, current driver assistance systems fail to take a driver's state into account, and may cause warning errors or insufficient actuations of accelerators, brakes or vehicle steering control.

European patent EP 1544 070 B1 discloses a driver assistance system with a capability to estimate an intention of the driver with a confidence indication by providing a plurality of imaginary operators. The estimated driver intention is used for modifying a risk value or other outputs generated based on the risk value. EP 1544 070 B1 provides a prediction for a discrete lateral behavior of other vehicles in lane change scenarios, determining whether the other vehicle will execute a lane change or will not execute the lane change. Improved assistance in EP 1544 070 B1 includes modifying actuation of an accelerator pedal or a braking system of the ego-vehicle based on the estimated driver intent and does not consider driver warning and risk communication scenarios.

The computer-implemented method according to independent claim 1 addresses these and further issues in an advantageous manner. The dependent claims define further advantageous embodiments.

SUMMARY

The computer-implemented method assists an agent, which is moving in a dynamic environment, and wherein at least one other agent is in the environment of the agent. The method comprises steps of obtaining sensor information on the environment of the agent; predicting at least one behavior of at least one of the agent or the at least one other agent based on the obtained sensor information; determining at least one human factor relevant for the predicted at least one behavior; adapting the predicted at least one behavior based on the determined human factor; and determining whether a communication of a consequence based on the adapted at least one behavior is beneficial to the acting of the agent. Such a consequence could be a collision or any other type of event resulting from the behaviors as predicted. The method generates a signal based on the adapted at least one behavior in case of determining that the communication is beneficial, and communicates the consequence or at least one of the predicted behaviors based on the generated signal to the agent. The method outputs a communication according to the generated signal to the agent. Such a communication could be a warning informing the agent of a collision or other event, which would be a result of the predicted behavior(s), or the predicted behavior(s) itself.

An agent is a person participating in the dynamic environment by acting, by moving, or at least being present, or acting to operate any kind of land, sea and air vehicle for moving such vehicle in the dynamic environment. The resulting movement of the agent or the vehicle operated by the agent defines a behavior.

The human factor according to the present invention defines an individual aspect of a specific agent currently participating in the dynamic environment and allows to adjust the predicted behavior to an individual, for example to a current agent's state.

Determining whether a communication of at least one of a consequence of the predicted behavior or one of the predicted behaviors based on the adapted at least one behavior is beneficial to the acting of the agent may include determining whether a communication based on the adapted at least one behavior is beneficial to the agent or to an overall traffic objective, e.g., safety.

BRIEF DESCRIPTION OF THE DRAWINGS

The aspects and implementation of the present disclosure will be explained in the following description of specific embodiments in relation to the enclosed drawings, in which.

Figure 1:
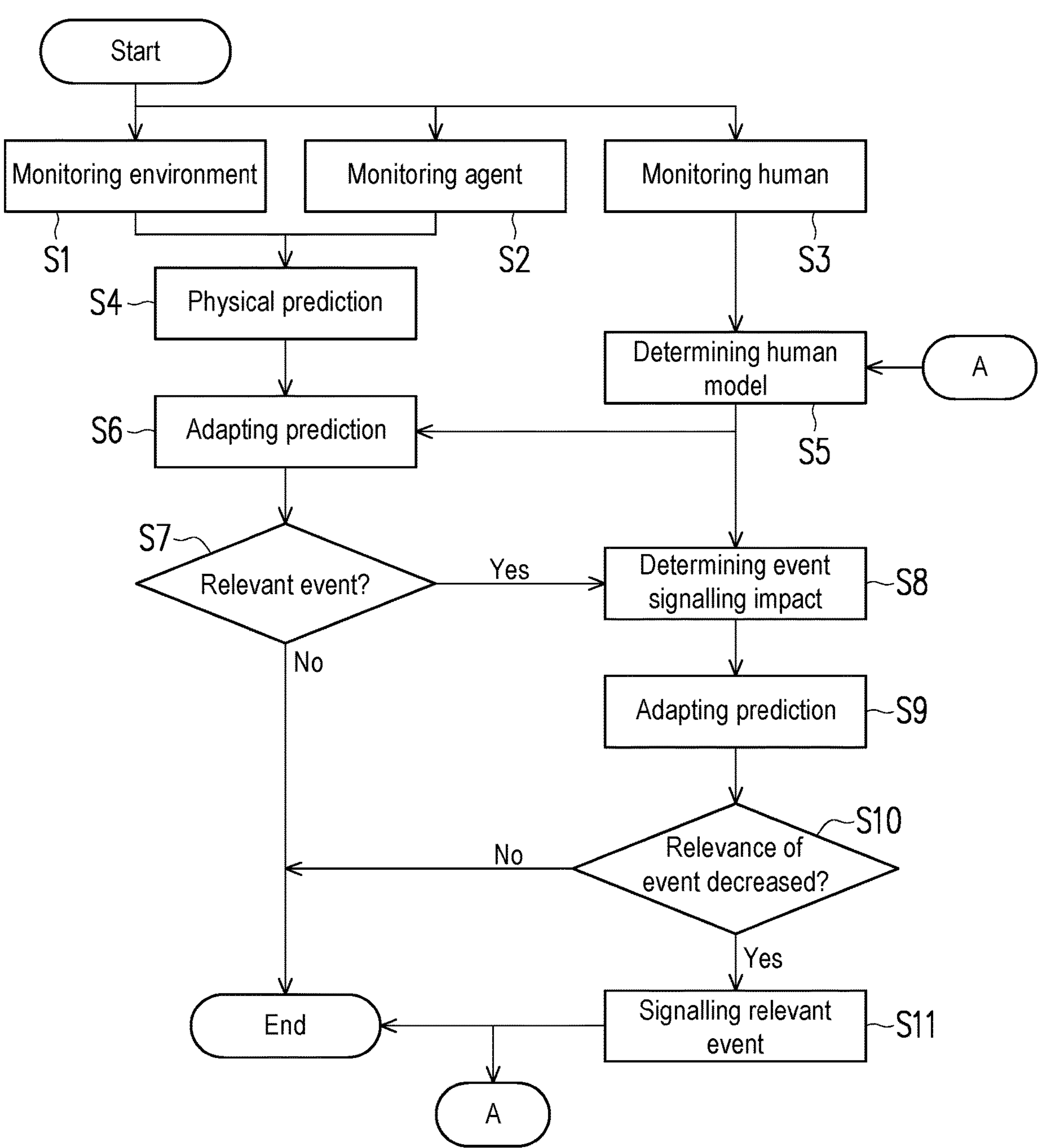
FIG. 1 is a flowchart that illustrates processes of an assistance method with human factors for assisting operation of an agent according to an embodiment.

The description of figures uses same references numerals for same or corresponding elements in different figures. The description of figures dispenses with a detailed discussion of same reference numerals in different figures whenever considered possible without adversely affecting comprehensibility.

DETAILED DESCRIPTION

The computer-implemented method provides a capability to predict physical behaviors of agents, and to adapt trajectories based on human factors for a long-term prediction. While current driver support systems do not take the agent's state into account, and therefore may cause warning errors, the computer-implemented method has the ability to take human factors that influence the prediction into account. The method improves driver support systems by improving the prediction of a behavior of the agent with human factors.

A human factor may include information on a human state, e.g. a physical state or a mental state of a human person that influences the behavior of human when acting in the environment. A mental state of a human may include an emotional state, a focus of the human, a distraction of the human, e.g., a distraction from a main driving task, or similar human factors. The human acting in the environment may include in particular the manner how the human operates a vehicle or how the human grasps the environment, including, e.g. information output via a human machine interface to the human. The agent may be a human person operating a physical agent, e.g. a vehicle, or the physical agent itself. For example, an emotion of a human may be estimated by performing an analysis of visual features in images captured from the face of the human. Some emotions are correlated with a more aggressive behavior of the human. An aggressive behavior in turn would increase the likelihood of a human driver reacting in a safety-reducing way in a traffic scenario.

The computer-implemented method according to an embodiment comprises determining, based on the adapted predicted at least one behavior, at least one event involving the agent, and estimating a risk associated with signaling information on the determined at least one event to the agent. The method further includes steps of adapting the adapted behavior further based on the estimated risk associated with signaling the information on the determined at least one event to the agent, determining whether the estimated risk associated with signaling information on the determined at least one event to the agent decreases based on the further adapted behavior, and generating and outputting the signal based on the further adapted at least one behavior in case of determining that the estimated risk has decreased.

Estimating a risk associated with signaling (communicating) information on at least one behavior includes estimating (determining) an impact of outputting the information on at least one behavior, e.g., a warning of a predicted collision, on decision making of a human person with relevance to the behavior or the further evolvement of current scenario in the environment.

Thus, the signaling of information to the assisted person or agent takes specific human behavioral aspects into account and improves a safe evolvement of the current traffic scenario.

The method enables to estimate a risk, and, in case of high risk, to evaluate an impact of the communication on a driver with human factors. If a communication is deemed beneficial, the method proceeds with transmitting an event signal to the ego-agent or to other agents.

Therefore, the amount of information communicated to the agent is limited to that information, from which the agent is actually benefitting. Providing unnecessary information is avoided. Acceptance of the assistance system will improve, as outputting annoying information is avoided.

The computer-implemented method according to an embodiment comprises estimating the risk associated with signaling information on the determined at least one event including evaluating an impact of signaling the information on the at least one trajectory.

Therefore, the assisted agent only obtains information on a predicted future movement path and movement related information.

The computer-implemented method according to an embodiment comprises estimating the risk associated with signaling information on the determined at least one event that includes predicting a human response to the information output in the signal, and enabling generating and outputting the signal including the information in case of determining a decrease of the estimated risk based on the predicted human response, and disabling generating and outputting the signal including the information in case of determining an increase of the estimated risk based on the predicted human response.

Thus, outputting information, whose communication may increase the risk in the predicted scenario in the dynamic environment is suppressed. Safety of the future evolvement of the traffic scenario increases.

The computer-implemented method according to an embodiment includes the determined at least one human factor including information on at least one of the agent, the at least one other agent, or a subset of or all other agents in the environment of the agent.

The computer-implemented method according to an embodiment comprises adapting, based on the determined human factor, the predicted at least one behavior of at least one of the agent, the at least one other agent or all other agents in the environment of the agent.

The computer-implemented method according to an embodiment comprises adapting the adapted behavior further based on the estimated risk associated with signaling the information on the determined at least one event to at least one of the agent, the at least one other agent, and all other agents in the environment of the agent.

The method may be easily tailored from improving the ACC system integrated within an advanced driver assistance system assisting the driver of an ego-vehicle to a combined and comprehensive analysis of human factors provided by a plurality of humans operating in the same dynamic environment.

The computer-implemented method according to an embodiment comprises updating a human model based on a determined reaction of at least one of the agent and the at least one other agent based on the predicted behavior in a previous processing cycle.

The method enables to improve the human model used for determining the human factor based on previous experience in a learning process integrated in an application phase of the assistance system and without having to (re-)enter a training phase.

The computer-implemented method according to an embodiment comprises determining a weight associated with the human factor based on a certainty of the human factor, and determining an impact of the human factor on the predicted behavior based on the determined weight.

Weighting of human factors enables to handle efficiently a plurality of human factors in the assistance system and to manage an influence of individual human factors on the predictions of the assistance system.

The computer-implemented method according to an embodiment comprises, in the step of determining at least one human factor relevant for the predicted at least one behavior, determining in combination human factor information associated with the agent and the least one other agent to determine a combined uncertainty associated with the at least one human factor.

Hence, the assistance system takes the human factors of plural agents into account, which all influence the uncertainty of the at least one human factor, and improve the further processing of the determined human factors the uncertainty for the plural human factors of plural agents. Processing requirements are eased.

The computer-implemented method according to an embodiment comprises determining whether the communication based on the adapted at least one behavior is beneficial to the agent and the at least one other agent that includes determining whether outputting the communication for the agent and the at least one other agent at different times is beneficial, and, in case of determining that the communication at different time steps is beneficial, generating and outputting the generated signal to the agent and the at least one other agent at different times.

Communicating information at different times to different agents may increase safety in the future evolvement of the current scenario in the dynamic environment. The embodiment enables to profit from this increase in safety in a computationally efficient manner.

The computer-implemented method according to an embodiment comprises determining whether the communication based on the adapted at least one behavior is beneficial to the agent and the at least one other agent that includes determining whether outputting the communication to the agent adversely affects the at least one other agent.

Thus, interdependencies in communicated information to different agents is recognized and may be used to increase safety of the future evolvement of the current traffic scenario.

The computer-implemented method according to an embodiment comprises determining whether the communication based on the adapted at least one behavior is beneficial to the agent and the at least one other agent that includes predicting, simulating behavior variations of the agent and the at least one other agent in response to a plurality of communication candidates, and determining for each communication candidate an effect of outputting the communication to the agent or the at least one other agent, and selecting the communication candidate or a combination of communication candidates based on the determined effects of the communication candidates.

Thus, a plurality of behavior options and communication options provided by the assistance system may be analyzed taking human factors into account for selecting a suitable option with a particular suitability for execution by a human agent.

The computer-implemented method according to an embodiment comprises communicating the generated signal to the at least one other agent for output via a human-machine interface of the at least one other agent.

The method is well suited for application in assistance systems integrating V2X communication for improved safety in road traffic scenarios.

The computer-implemented method according to an embodiment comprises predicting the at least one behavior of at least one of the agent or the at least one other agent based on the obtained sensor information over a first time into the future using a physical prediction, and predicting the at least one behavior and adapting the predicted at least one behavior based on the determined human factor over a second time into the future. The first time is shorter than the second time. In an example, the first time ranges from 0 to 2 seconds, and the second time includes times exceeding 2 seconds. In alternative embodiments and application scenarios, a threshold larger than the cited 2 seconds separating the first time including the physical prediction and the second time including adapting the predicted at least one behavior based on the determined human factor may be advantageous. This applies in particular in embodiments that may require a larger threshold between the first time and the second time for physical predictions before any, e.g., less reliable, human factors are taken into consideration.

The method is particularly advantageous for enhancing long-term prediction of behavior in assistance systems, as the human component introduced with the human factor adapting the physical prediction yields particularly advantageous results for prediction horizons that extend far into the future. For example, adapting the predicted behavior based on the human factor information refines the predictions for prediction horizons, in which the human may act or not act in response to an evolvement of the current scenario.

The computer-implemented method according to an embodiment comprises the physical prediction including a longitudinal behavior comprising at least one of a constant velocity, a constant deceleration or a constant acceleration, and a delayed constant acceleration, the physical prediction including a lateral behavior comprising at least one of moving with a constant turning angle, a movement along map paths, a lane change, and taking a left path, a straight path or a right path at an intersection, the physical prediction including environmental parameters, in particular a road inclination angle, a road curve radius, predicting the at least one behavior and adapting the predicted at least one behavior includes a longitudinal behavior comprising at least one of a behavior change based on a driver model and a driver state, in particular the behavior change includes at least one of a change in deceleration value or acceleration value, a change from a constant velocity to a constant acceleration at a future time, and a change from a constant acceleration to a constant velocity at the future time, in particular the behavior change includes a delay based on a determined driver state, wherein the determined driver state includes one of an attentive state, a drowsy state, a surprised state, a distracted state, an expert driver state, an inexperienced state, a disoriented state, predicting the at least one behavior and adapting the predicted at least one behavior includes a lateral behavior comprising a lane change, taking a left, a straight or a right path at an intersection, a swerving around a center line or a mean course of the agent.

The decision to change lanes in a road traffic scenario can be related to human factors. As an example, a surprised driver, corresponding to a driver in a determined surprised state (surprised mental state) may make a sudden lane change in a specific traffic scenario, different to a driver that is determined to be in an unsurprised state (unsurprised mental state) in the same traffic scenario. In consequence, the surprised driver comes close to other vehicles driving on a on a neighboring lane nearby. At an intersection, human factors included in the human factor information may also change the driving style of the human driving a vehicle. At the intersection, the driving style of how the left turn, right turn or going straight is done by the driver may vary in dependence on the determined human factor. For example, a driver in a drowsy state might be more likely to drive outside boundaries of his lane while turning left at the intersection. As a consequence, adapting the prediction based on the determined human state of the driver can improve the quality of the physical prediction. The assistance method may be easily integrated into a variety of assistance systems currently in use in automotive scenarios.

The computer-implemented method according to an embodiment comprises estimating the risk including estimating the risk associated with signaling information on the determined at least one event to the agent and further associated with signaling information on the determined at least one event to the at least one other agent, and generating and outputting the signal to the agent and the further signal to the at least one other agent in case of determining that outputting the signal and the further signal decreases the estimated risk.

Thus, the method is adaptable to scenarios including plural agents and the respective human factors associated with them.

The computer-implemented method according to an embodiment comprises executing the computer-implemented method by at least one processor collocated with the agent.

The computer-implemented method according to an embodiment comprises executing the computer-implemented method in a distributed manner by processors of at least two of the agent, of the at least one other agent, and of at least one server remote from the agent and the at least one other agent.

The method steps performing an integration of information and of prediction of behaviors may be carried out locally, e.g., in a computing resource of the agent, or by central instances with fast access to data from a plurality of traffic participants, environmental sensors, and databases and means of selectively distributing communication signals based on the generated output among traffic participants.

For example, in some embodiments, vehicle sensors may acquire user data and vehicle data that the vehicle then transmits to an external computation node, e.g. a remote server. The computation node receives data from a variety of additional sources, and may generate a more comprehensive model of a traffic scenario than each individual agent participating in the local traffic scenario may be able to.

The computer-implemented method according to an embodiment comprises transmitting information on the human factors and associated impact of the human factors on the predicted behavior to at least one of the at least one other agent and at least one remote server.

The computer-implemented method according to an embodiment comprises executing the computer-implemented method in an advanced driver assistance system of an ego-vehicle.

The computer-implemented method according to an embodiment comprises executing at least some steps of the computer-implemented method by a remote server remote to the agent.

Hence, the computer-implemented method may implement a utility-based selectivity: an external computation node may distribute information selectively to those connected agents, e.g., vehicles and devices, for which the information is determined to be beneficial. The external computation node may consider that some computations and communication between the agents can also take place locally.

The presence of another vehicle following an ego-vehicle closely on a same lane (tailgating vehicle) is relevant to the safety. Nevertheless, alerting the driver of the ego-vehicle about the presence of the tailgating vehicle is not necessarily useful in a case in which the driver of the ego-vehicle has a tendency to react to a notification on the presence of the tailgating other vehicle by increasing his velocity (speeding). In this case, the human factor including a "tendency to react by speeding" would be a personal and statistically determined human factor that may disqualify the transmission of information by the assistance system for the ego-driver in the discussed scenario. In contrast, for another driver of the ego-vehicle who "tends to react to the notification on the tailgating other vehicle by increasing the safety distance to another vehicle driving on the same lane in the same direction as the ego-vehicle (preceding other vehicle)" in order to afford smoother braking for decreasing a risk of a rear-impact crash, the information would be utilized in a beneficial way and the assistance system should act accordingly. In a case in which no human factor information about what an individual driver "tends to do" is available, an average driver reaction might be considered for some embodiments or scenarios as the human factor information.

Hence, the computer-implemented method may implement an inhibition feature: in case of a risk for conflicting local conclusions reached by an agent and global conclusions drawn by the external computation node, either the local agent or the external computation node may inhibit the propagation of specific information from other information sources to prevent a predicted negative impact from occurring. Authority in such cases may depend on respective measures of confidence. If, e.g., a predicted negative impact of specific information for a specific agent by the external computation node has a higher confidence than a predicted positive impact by a local computation node, e.g., on the agent itself, then the external computation node may inhibit the information from the local computation node and vice versa.

According to an embodiment of the computer-implemented method, the determined event is a predicted collision involving the agent or a near-collision involving the agent.

According to an embodiment of the computer-implemented method, the at least one behavior includes at least one trajectory of at least one of the agent or that least one other agent.

According to an embodiment of the computer-implemented method, the agent and the at least one other agent include at least one of a pedestrian, a cyclist, a motorcyclist, and a driver of a road vehicle in a road traffic environment.

A human that operates a vehicle in a dynamically changing road traffic environment may benefit from the computer-implemented method which provides specific predictions of the road traffic environment that regard human factors that are relevant for adapting predictions and evaluating events. Hence, quality of predictions and the provided support by the driver assistance system improves. Acceptance of the support by users of the assistance systems implementing the method will increase.

FIG. 1 is a flowchart that illustrates processes of a prediction method with human factors for assisting operation of an agent according to an embodiment.

The process steps S1 to S11 of the computer-method illustrated by the flowchart of FIG. 1 may be applied in an advanced driver assistance system supporting a human in operating a vehicle in a traffic environment. The block diagram of FIG. 2 displays a general structure of the processing modules of the computer-implemented method, while FIG. 3 illustrates structural elements and considerations of an assistance system 1 for assisting an agent in moving in a dynamic traffic environment. The agent and the at least one other agent include at least one of a pedestrian, a cyclist, a motorcyclist, and a driver of a road vehicle in a road traffic environment.

The computer-implemented method starts with obtaining sensor information on the environment of the agent in steps S1, S2, and S3. In particular, in step S1, the method is monitoring the environment of the agent. In step S2, the method monitors the agent, e.g., obtains sensor information on an ego-vehicle. In step S3, the method performs human monitoring, which includes monitoring, e.g., a human driver of the ego-vehicle.

The method may perform steps S1, S2, and S3 in parallel. Additionally, the method may perform steps S1, S2, and S3 cyclically, e.g. at least once each processing cycle of the computer-implemented method. Additionally, the computer-implemented method may perform the steps S1, S2, and S3 continuously during execution of the method.

In step S4, the method proceeds with predicting at least one behavior of at least one of the agent or the at least one other agent based on the obtained sensor information. In particular, step S4 may include performing a physical prediction for predicting a behavior of the agent and the at least one other agent in the environment of the agent based on environment information acquired by at least one environment sensor 2 and agent-related information acquired by at least one agent sensor 3.

In step S5, the method determines at least one human factor relevant for the predicted at least one behavior based on the obtained sensor information. In particular, step S5 may include determining at least one human factor relevant for the predicted at least one behavior based on the obtained human information of the agent acquired by the at least one human monitoring sensor. The human monitoring sensor may be a driver sensor 2 adapted to determine at least one parameter (human state parameter) for determining a human state that is relevant for influencing human behavior in the environment.

The determined at least one human factor includes information on at least one of the agent, the at least one other agent, and a subset of or all other agents in the environment of the agent.

In step S6 following to steps S4 and S5, the method proceeds with adapting, based on the determined human factor, the predicted at least one behavior of at least one of the agent, the at least one other agent or all other agents in the environment of the agent.

In step S6, the method adapts the predicted at least one behavior from step S4 based on the determined human factor from step S5.

Step S6 may include determining a weight associated with the determined human factor based on a certainty of the determined human factor, and determining an impact of the determined human factor on the predicted behavior based on the determined weight.

The computer-implemented method of one embodiment extending the flowchart of FIG. 1 may proceed directly from adapting the prediction based on human factors in step S5 to step S11. In step S11, the method generates a signal based on the adapted at least one behavior in case of determining that the communication is beneficial to the agent. The method then outputs the generated signal to the agent for assisting the agent in operating in the environment.

The computer-implemented method of an advantageous embodiment further includes steps S7 to S10.

In step S7 following step S6, the method determines, based on the adapted predicted at least one behavior from step S6, at least one event involving the agent. In case the method determines in step S7, that there is no relevant event based on the adapted prediction in the environment, the processing of the method terminates. If the method in step S7 determines that there exists at least one relevant event based on the adapted prediction, the processing proceeds to step S8.

In step S8, the method estimates a risk associated with signaling information on the determined at least one event to the agent. In particular, the estimating the risk includes determining based on the human factor determined in step S5, an impact of a signaling of information generated based on the adapted prediction to the agent.

Estimating the risk associated with signaling information on the determined at least one event in step S8 may include evaluating an impact of signaling the information on the at least one trajectory to the agent.

Estimating the risk associated with signaling information on the determined at least one event may include predicting a human response to the information output in the signal to the agent.

In step S8, the method may determine whether the communication based on the adapted at least one behavior is beneficial to the agent and the at least one other agent comprising determining whether outputting the communication to the agent adversely affects the at least one other agent.

In step S8, determining whether the communication based on the adapted at least one behavior is beneficial to the agent and the at least one other agent includes predicting and simulating behavior variations of the agent and the at least one other agent in response to a plurality of communication candidates. The method then determines for each communication candidate an effect of outputting the communication candidate to the agent or the at least one other agent, and selects the communication candidate or a combination of communication candidates based on the determined effects of the communication candidates.

When evaluating a warning or support of multiple agents in the environment, the method may implement additional functionalities.

Warnings of agents may be performed at different times, e.g. warn vehicle A first so that vehicle A reacts on vehicle B and that vehicle A has sufficient distance to vehicle B and then warn vehicle B about vehicle A for future possible interactions, such as, for lane changes). This can allow to resolve negative impacts of the warning for one or more drivers of a vehicle. Additionally or alternatively, the method may check if the warning of multiple agents is beneficial, e.g., the modality of warning vehicle A affects negatively vehicle B. This may be the case when A is a pedestrian and is warned via audio. Another pedestrian, may be distracted by the warning of pedestrian A, but should receive an own warning to mitigate a potential collision. Evaluating may be done by predicting and simulating the different variations of the predicted behaviors and checking a total net warning impact for all simulated variations of the predicted behaviors. A best combination of warnings will be applied for vehicles in a driving situation to reduce the complete overall driving situation risk of the current scenario in the traffic environment.

Evaluating a warning or support of multiple agents bases on simulating variations of predicted behaviors representing traffic development possibilities, wherein the range of possibilities is extended by regarding the human factor for different variations or possibilities of communicating risks in warning signals to the plural agents, or respectively not communicating risks to at least some agents. Some human factors may influence reaction time distributions, others may influence safety margins and lane changing probabilities in a predicted future evolvement of the traffic scenario. The method may select from the simulated variations of predicted behaviors by executing an optimization process that minimizes a risk measure that considers the accident probability and potential severity for each combination of predicted behaviors and output signals to the multiple agents.

In step S9, the method proceeds with further adapting the predicted behavior based on the estimated risk associated with signaling the information on the determined at least one event to the agent.

Step S9 comprises further adapting the predicted behavior based on the estimated risk, further based on the determined human factor includes adapting the predicted at least one behavior of at least one of the agent, the at least one other agent or all other agents in the environment of the agent.

In step S10 subsequent to step S9, the method determines whether the estimated risk associated with signaling information on the determined at least one event to the agent decreases based on the further adapted behavior. In case step S10 determines that the risk did decrease ("YES"), the method proceeds to step S11.

In step S11, the method generates and outputs the signal based on the further adapted at least one behavior in case of determining in step S10 that the estimated risk has decreased. In particular, the method may communicate the determined relevant event to the agent, as the determined signaling impact of step S8 indicated the signaling to be advantageous for the future evolvement of the scenario in the environment.

In case step S10 determines that the risk did increase ("NO"), the method may terminate for the specific agent. In particular, in case the processing according to the method indicated based on the determined signaling impact (estimated risk) in step S8 the signaling based on the adapted description being disadvantageous for the future evolvement of the scenario in the environment.

The method may include enabling generating and outputting the signal including the information in case of determining a decrease of the estimated risk based on the predicted human response, and disabling generating and outputting the signal including the information in case of determining an increase of the estimated risk based on the predicted human response to the signaling.

The method may include in step S8, determining whether the communication based on the adapted at least one behavior is beneficial to the agent and the at least one other agent comprising determining whether outputting the communication for the agent and the at least one other agent at different times is beneficial. In case of determining that the communication at different time steps is beneficial, the method proceeds in step S11 with generating and outputting the generated signal to the agent and the at least one other agent at different times.

In step S11, the method may comprise communicating the generated signal to the at least one other agent for output via a human-machine interface of the at least one other agent. In step S8, estimating the risk includes estimating the risk associated with signaling information on the determined at least one event to the agent and estimating the risk further associated with signaling information on the determined at least one event to the at least one other agent. Signaling the relevant event in step s11 then includes generating and outputting the signal to the agent and the further signal to the at least one other agent in case of determining that outputting the signal and the further signal decreases the estimated risk.

The method may further include, after signaling the relevant event to the agent, updating the human model based on a determined reaction of at least one of the agent and the at least one other agent based on the predicted behavior in a previous processing cycle. FIG. 1 indicates an updating of the human model by the link A-A between steps S11 and S5. The method may determine the reaction based on the sensor information from the environment, the agent, or the human. Updating the human model based on a determined reaction of at least one of the agent and the at least one other agent may base on the adapted predicted behavior from a previous processing cycle (iteration) of the method.

Figure 2:
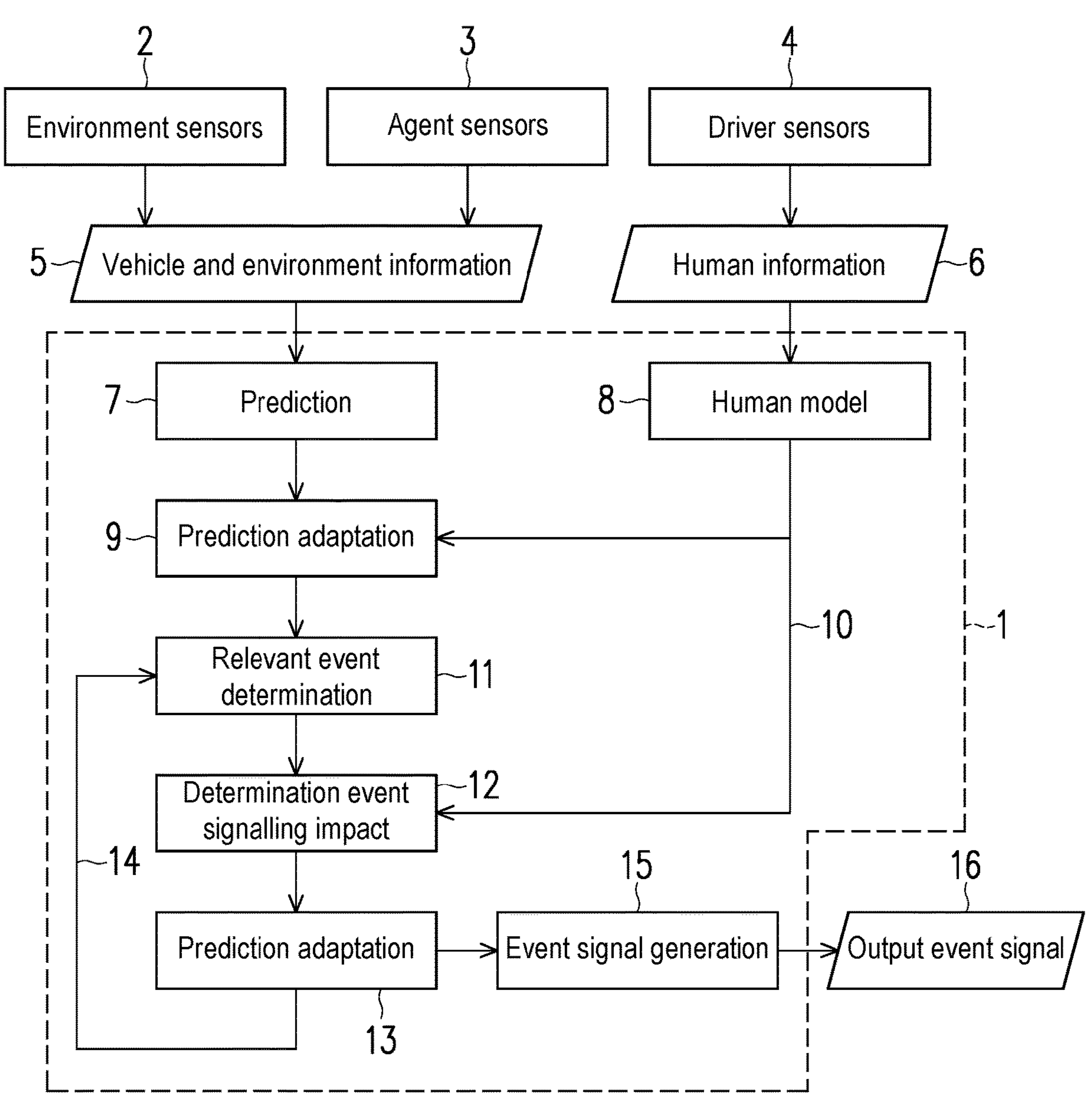
FIG. 2 shows a simplified block diagram illustrating the processing structure of the assistance method with human factors for assisting operation of an agent according to an embodiment.
Figure 3:
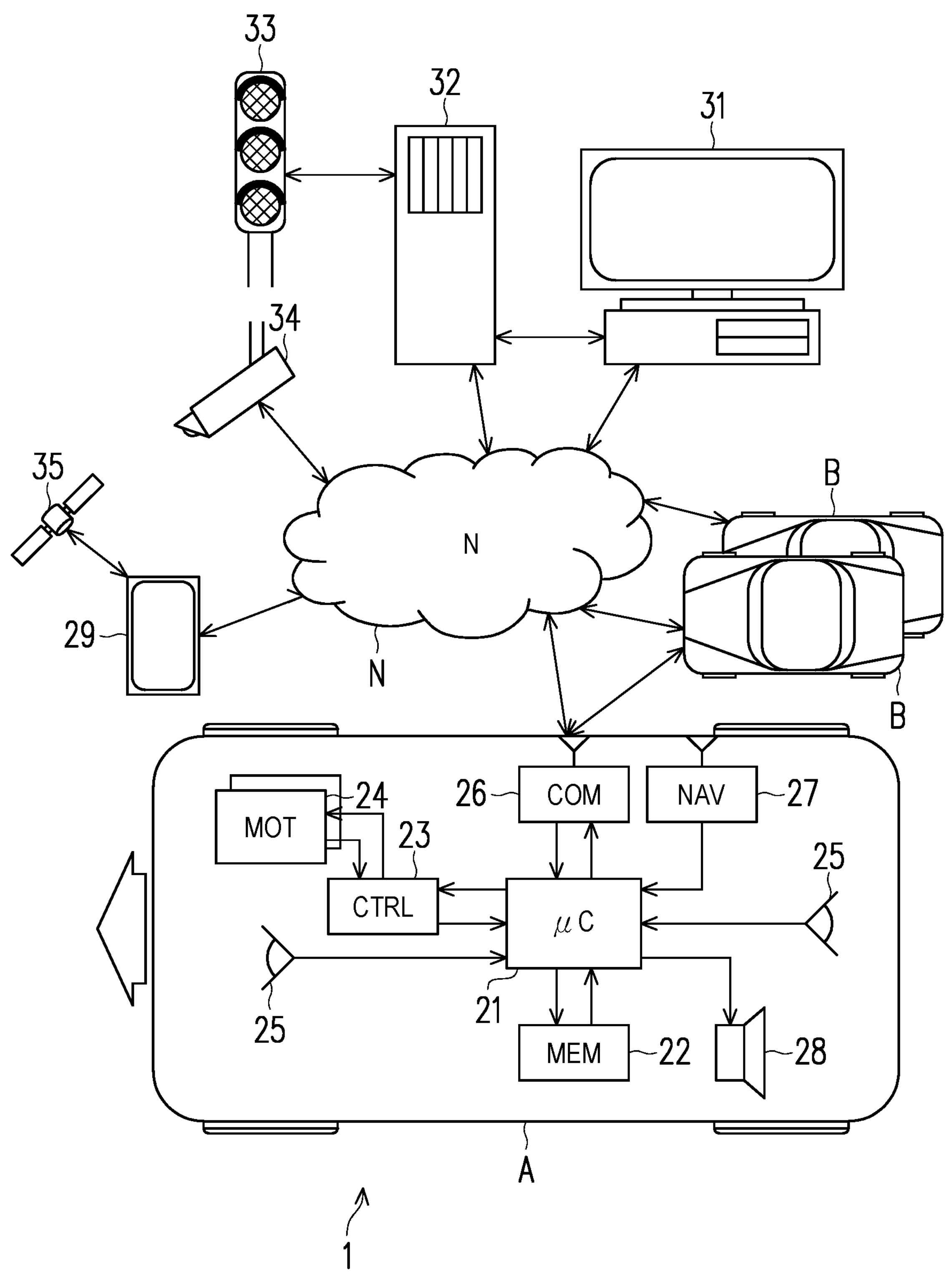
FIG. 3 illustrates examples for a system structure configured to implement embodiments of the assistance method with human factors for assisting operation of an agent.

FIG. 2 shows a simplified block diagram illustrating the processing structure of the prediction method with human factors for assisting operation of an agent according to an embodiment.

A driver assistance system 1 configured to perform the computer-implemented method according to an embodiment includes a prediction module 7.

The prediction module 7 performs a physical prediction based on the vehicle and environment information 5 provided by the environment sensors 2 and the agent sensors 3.

The environment sensors 2 may include a sensor suite including a plurality of sensors comprising cameras, RADAR sensors, LIDAR sensors, acoustic sensors for acquiring the sensor information including environment information on the environment of the agent.

The agent sensors 3 may include sensors that acquire position data, orientation data and movement data on the agent assisted by the assistance system 1.

The driver sensors 4 may include sensors that acquire human information 6 on a human operator of the agent assisted by the assistance system.

The prediction module 7 may perform the physical prediction to generate a predicted longitudinal behavior comprising at least one of a constant velocity (CV), a constant deceleration or a constant acceleration (CA), and a delayed constant acceleration, of the agent. The physical prediction module 7 predicts the physical behavior of the agent and the at least one other agent based on the vehicle and environment information 5 provided by the environment sensors 2 and the agent sensors 3. The predicted behavior may include at least one predicted trajectory of the agent.

The physical prediction may include a predicted lateral behavior comprising at least one of moving with a constant turning angle, a movement along map paths, a lane change, and taking a left path, a straight path or a right path at an intersection.

The physical prediction may include predicted environmental parameters, in particular a road inclination angle, a road curve radius. The environmental parameters may be known from map data, wherein the timing may base on the prediction.

The driving assistance system of the embodiment further includes a human model determination module 8. The human model determination module 8 determines the human factor 10 based on the human information 6 provided by the driver sensors 4 and provides the determined human factor 10 to a (first) prediction adaptation module 9 and an event-signaling impact determination module 12. The human model determination module 8 may determine the human factor 10 based on the human information 6 acquired via access to stored information, e.g. recorded information on the specific human driver. The human model determination module 8 may determine the human factor 10 based on the human information 6 generated and stored in previous steps of human modeling the driver. The human model determination module 8 may determine the human factor 10 based on the human information 6 acquired via V2X communication over a network N.

The prediction adaptation module 9 adapts the predicted behavior provided by the prediction module 7. Adapting the predicted at least one behavior by the prediction adaptation module 9 may include adapting a longitudinal behavior comprising at least one of a behavior change based on a driver model or a driver state, and adapting the predicted at least one behavior includes a lateral behavior comprising a lane change, taking a left, a straight or a right path at an intersection, a swerving around a center line.

In particular, the behavior change may include at least one of a change in deceleration value or acceleration value, a change from a constant velocity to a constant acceleration at a future time, and a change from a constant acceleration to a constant velocity at the future time.

Alternatively or additionally, the behavior change may include a delay based on a determined driver state, wherein the determined driver state includes one of an attentive state, a drowsy state, a surprised state, a distracted state, an expert driver state, an inexperienced state, and a disoriented state, for example.

The prediction adaptation module 9 provides the adapted predicted behavior to relevant event determination module 11.

The relevant event determination module 11 determines at least one relevant event in the environment of the agent and involving the agent and at least one other agent based on the adapted predicted behavior provided by the prediction adaptation module 9.

The event-signaling impact determination module 12 obtains the at least one relevant event determined by the relevant event determination module 11, and estimates a signaling impact for each determined relevant event. The event-signaling impact determination module 12 may determine the signaling impact for the agent alone and based on the human factor 10 provided by the human model determination module 8.

Additionally or alternatively, the event-signaling impact determination module 12 determines the signaling impact for the agent and for the other agent(s) based on the human factor 10 provided by the human model determination module 8.

Based on the determined signaling impact(s) for the predicted behavior of the agent, and potentially also of the other agent, the assistance system 1 may further adapt the adapted predicted behavior provided by the prediction adaptation module 9 in the (second) prediction adaptation module 13 based on the determined event signaling impact.

The assistance system may iteratively run the processes in the relevant event determination module 11, the event-signaling impact determination module 12 and the prediction adaptation module 13 as indicated by the feedback loop 14 from the prediction adaptation module 13 to the relevant determination module 11.

The prediction adaptation module 13 provides the further adapted behavior to an event-signal generation module 15, which generates the output event signal 16 based on the further adapted prediction and controls output of the output event signal 16 via at least one output device 28 of the agent.

In a specific embodiment of the computer-implemented method, the processing proceeds from the prediction adaptation in the prediction adaptation module 9 directly to the event signal generation of the event output event signal 16 without determining the at least one event and analyzing the impact of each determined relevant event in the relevant event determination module 11, the event-signaling impact determination module 12 and the second prediction adaptation module 13.

The prediction module 7, the human model determination module 8, prediction adaptation module 9, the relevant event determination module 11, the event-signaling impact determination module 1, the prediction adaptation module 13, and the event-signal generation module may be implemented in software running on at least one computer or processor with associated memory. The at least one processor with associated memory, may include, e.g., a processor 21 and memory 22 of an ego-vehicle A (host vehicle A).

The computer-implemented method may be used with a variety of driver assistance systems in the automotive field, that base on predicting behaviors of agents. Such driver assistance systems may include for example systems and methods that base on an application of risk maps, e.g., US 2020/0231149 A1 planning for priority based intersections, The method supports driving of the ego-vehicle and comprises the steps of retrieving a priority relationship between the ego-vehicle (ego-agent) and at least one other traffic participant (other agent) involved in a traffic situation; selecting a prediction model for the at least one traffic participant depending on the priority relationship; predicting at last one hypothetical future trajectory for the ego-vehicle and, based on the selected prediction model, at last one hypothetical future trajectory for the at least one traffic participant; and calculating a behavior relevant score for ego-vehicle based on the calculated hypothetical future trajectories.

A further driver assistance system that may integrate the computer implemented method according to an embodiments is disclosed in US 2022/316897 A1, which shows a system to visualize personal risk spaces, The prediction module 7 may implement a prediction as integrated in advanced driver assistance systems disclosed in U.S. Pat. No. 8,903,588 B2 computationally predicting future movement behaviors of at least one target object by steps of producing sensor data by at least one sensor physically sensing the environment of a host vehicle, and computing a plurality of movement behavior alternatives of a target object sensed by the sensor(s). A context based prediction step uses a set of classifiers, each classifier estimating a probability that said sensed target object will execute a movement behavior at a time. The method can also include validating the movement behavior alternatives by a physical prediction comparing measured points with trajectories of situation models and determining at least one trajectory indicating at least one possible behavior of the traffic participant, estimating at least one future position of the traffic participant based on the at least one trajectory, and outputting a signal representing the estimate future position.

U.S. Pat. No. 9,969,388 B2 discloses computing a plurality of movement behavior alternatives of the target object sensed by sensors. The computing includes predicting movement behaviors of the target object applying context based prediction using at least one indirect indicator and/or indicator combinations derived from senor data. In the context based prediction, a probability that the target object will execute a movement behavior is estimated. A future position of the target object is estimated and a signal representing the estimated future position is outputted. At least one history indicator for a movement behavior alternative is generated for a current point in time using at least one indicator of an indirect indicator at a point in the past.

The prediction module 7 may implement a prediction based on the disclosure U.S. Pat. No. 9,620,008 B2 using global scene context for adaptive prediction.

U.S. Pat. No. 9,308,919 B2 also discloses useful information relating to a driving assistance system including a prediction subsystem in a vehicle. U.S. Pat. No. 9,308,919 B2 comprises steps of accepting a set of basic environment representations; allocating a set of basic confidence estimates; associating weights to the basic confidence estimates; calculating a weighted composite confidence estimate for a composite environment representation; and providing the weighted composite confidence estimate as input for an evaluation of a prediction based on the composite environment representation.

EP 2 840 007 B1 concerns a driver assistance system for a vehicle, and comprises generating a decision signal by a first evaluation of sensor data acquired by the sensor means, generating an activation signal for the actuating means when the decision signal exceeds a signal threshold, generating a interrupt decision signal based on a second evaluation, stabilizing the activation signal in a temporal manner, deciding based on the decision interrupt signal if to interrupt stabilizing the activation signal, and interrupting stabilizing the activation signal, when it is decided to interrupt stabilizing the activation signal.

EP 2 845 779 B1 concerns consistent behavior generation of a predictive advanced driver assistant system, and comprises generating a decision signal by a first evaluation of sensor data acquired by the sensor means, generating an activation signal for the actuating means when the decision signal exceeds a signal threshold, generating a interrupt decision signal based on a second evaluation, stabilizing the activation signal in a temporal manner, deciding based on the decision interrupt signal if to interrupt stabilizing the activation signal, and interrupting stabilizing the activation signal, when it is decided to interrupt stabilizing the activation signal.

U.S. Pat. No. 10,625,776 B2 discloses a confidence estimation for predictive driver assistance system based on plausibility rules and concerns driving assistance technique for active vehicle control, which may be employed in combination with the present disclosure.

FIG. 3 illustrates various examples of a system structure suitable to implement embodiments of the prediction method with human factors for assisting operation of an agent. FIG. 3 shows a system structure suitable for implementing different embodiments of a driver assistance system for supporting a driver in operating an ego-vehicle A in a road traffic environment.

The computer-implemented method for assisting the agent according to an embodiment may be implemented in software executed by at least one processor 21 of the ego-vehicle A.

In an alternate embodiment, the computer-implemented method for assisting the agent is implemented in software executed by processors of at least two of the vehicles A, B in the road traffic environment.

In a further alternative embodiment, the computer-implemented method is executed in a distributed manner on processors 21 of the agent (ego-vehicle A), the at least one other agent (other vehicle B), and of at least one server remote from the agent and the at least one other agent.

The servers 31, 32 may include a server 31 with a human machine interface, which enables to access, control, or modify the processing of the computer-implemented method and other elements of the driver assistance system according to an embodiment.

Each server may include one or plural processors, e.g., central processing units CPU), signal processors, and associated memory, e.g., including read-only memory (RAM), read only memory (ROM), and disk data storage, flash memory, for naming some known structural elements.

The servers 31, 32 may include at least one server 32 configured to control and to acquire information from traffic infrastructure devices arranged in the road traffic environment, e.g., from traffic lights or from cameras 34 monitoring the road traffic environment.

Independent from the distribution of the processing of the computer-implemented method, the driver assistance system 1 of the ego-vehicle A may obtain sensor information on the environment of the ego-vehicle A from its own sensors 25,26, or from sensors externally to the ego-vehicle A via the network N and the communication interface 26 of the ego-vehicle A. In FIG. 3, the sensors arranged externally to the ego-vehicle A include the camera 34, and may include sensors of the sensor suites of the other vehicle(s) B. Sensors may also include a navigation system, e.g. a navigation receiver of a global navigation satellite system (GNSS) providing navigation services using a plurality of navigation satellites 35.

The ego-vehicle A includes the plurality of sensors 25, 26 for monitoring the environment of the ego-vehicle A, for monitoring the driver of the ego-vehicle, and for providing operational information of the ego-vehicle A.

The information acquired from the environment of the ego-vehicle may include information on position, orientation, velocity, acceleration or deceleration of the ego-vehicle A and the other vehicle(s) B present in the environment of the ego-vehicle A.

The information on the ego-vehicle A may include information on the position, orientation, velocity, acceleration or deceleration of the ego-vehicle A, on throttle position, steering angle, gear selection, motor parameters, e.g., a rotational speed or a torque value of a drive motor 24.

The information on the driver of the ego vehicle A may include information acquired by a camera or a microphone monitoring the interior including the driver of the ego-vehicle A. The information on the driver of the ego vehicle A may include any piece of information that allows the driver assistance system 1 to determine a driver state as one particular example of the human factor used in the computer implemented method according to an embodiment.

The agents, e.g., the ego-agent or the other agent, may include humans with personal computing devices 29, e.g. smart appliances such as smartphones communicating via the network N with other elements in the environment of the ego-agent. For example, the ego-agent may be a human user equipped with a personal computing device 29.

The ego-vehicle A includes a communication interface 26. The communication interface 26 enables wireless communication between the ego-vehicle A and other agents and with infrastructure of the road traffic environment. In particular, the communication interface may enable direct communication with other vehicles B in the environment of the ego-vehicle A, which also include respective communication interfaces.

The communication interface 26 may enable communication via a network N with other elements of the road traffic environment. The other elements may include the other vehicles B, and servers 31, 32.

The communication interface 26 may enable communication via a network N with humans such as pedestrians or cyclists having personal devices 29, e.g., smartphones, which also form part of the road traffic environment.

The communication interface 26 may enable communication to integrate the ego-vehicle A into a V2X system by transmitting and receiving signals from other vehicles and traffic infrastructure, for example.

The ego-vehicle A of FIG. 3 further includes a data storage device 22 (memory 22).

The ego-vehicle A of FIG. 3 further includes an output module 28. The output module 28 may include means for outputting information via different modalities, in particular visually, acoustically, or haptically to the driver of the ego-vehicle A. The output module 28 forms part of a human machine interface of the driver assistance system 1 of the ego-vehicle A. The output module 28 may include a head-up display for providing the information to the driver of the ego-vehicle without requiring the driver to divert his attention from the road traffic environment. The output module 28 may include at least one of at least one loudspeaker for outputting acoustic signals, at least one display for outputting visual signals, or a haptic output means for outputting tactile signals to the driver of the ego-vehicle A. The processor 21 may change the modality of the output signals to the driver. Alternatively or additionally, the processor 21 may adapt the strength, e.g., an output intensity, of the signal conveying the information to the driver of the ego-vehicle A.

Figure 4:
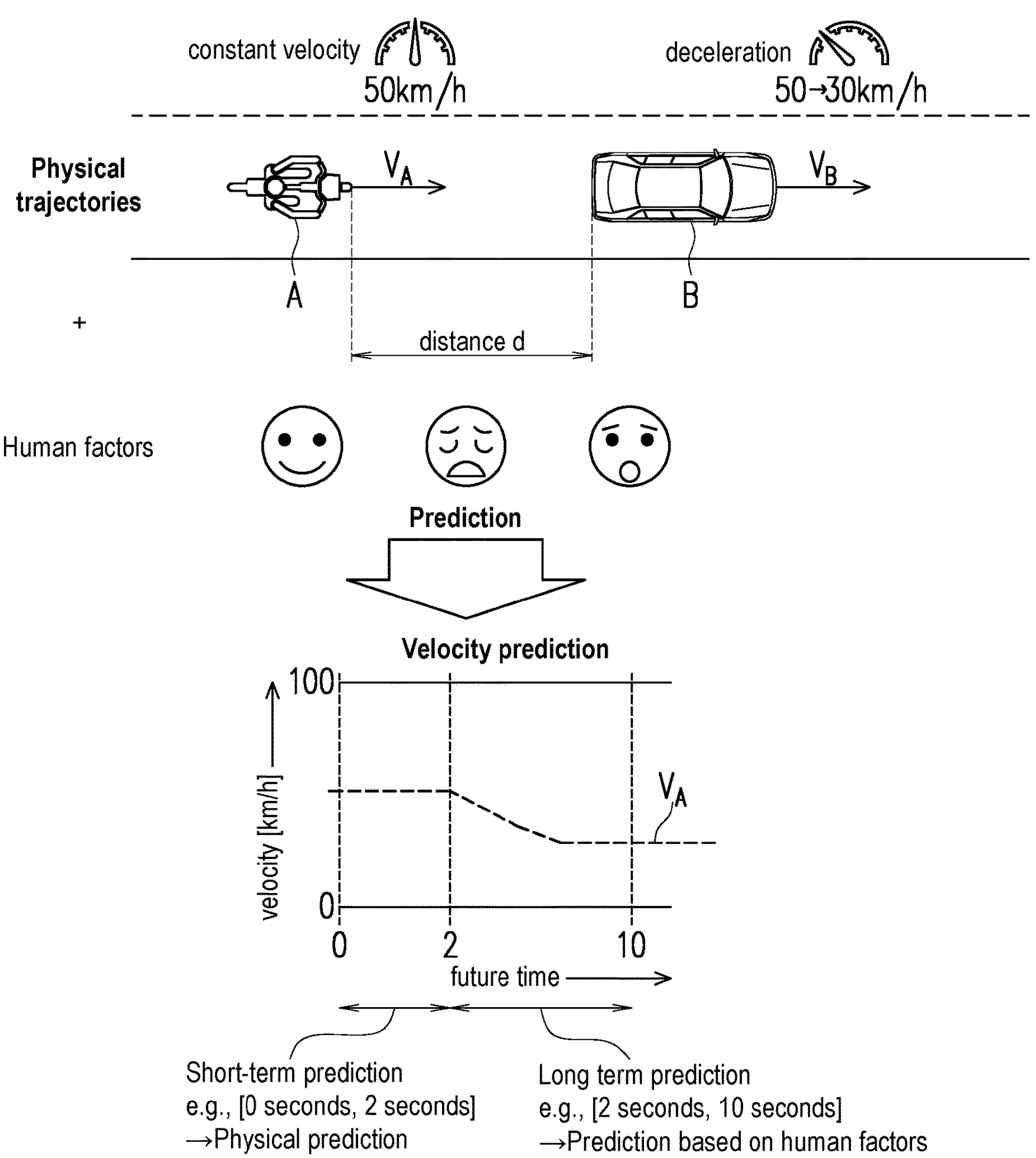
FIG. 4 illustrates an application example of a prediction method with human factors for assisting operation of an agent in a road traffic environment.

FIG. 4 illustrates a first application example of a prediction method with human factors for assisting operation of an agent in a specific road traffic environment.

The depicted road traffic scenario in the upper part of FIG. 4 includes the ego-vehicle A moving with a constant velocity $V_A$ along a lane of a road. In front of the ego-vehicle A in driving direction of vehicle A, another vehicle B is moving with a velocity $V_B$ on the same lane in the same direction as vehicle A. The distance between the vehicle A and the vehicle B is $d_0$ at a time t=0. The other vehicle B decelerates with a constant deceleration rate from a first velocity $V_B$=50 km/h to a second velocity $V_B$=30 km/h.

The driver assistance system supporting the driver of vehicle A analyzes the traffic scenario of FIG. 4 based on the information acquired by sensors 2, 3 from the environment describing the depicted traffic scenario of FIG. 4 and predicts a future evolvement of the traffic scenario. The driver assistance system performs not only a physical prediction based on the acquired information on the environment, but also determines human factors illustrated in FIG. 4 by the human states "attentive driver", "drowsy driver", and "surprised driver".

The method illustrated in FIG. 4 predicts the at least one behavior of at least one of the agent or the at least one other agent based on the obtained sensor information over a first time into the future using a physical prediction, and predicts the at least one behavior and adapting the predicted at least one behavior based on the determined human factor over a second time into the future.

The prediction using physical prediction is short-term prediction. The prediction using an adapted prediction adapted based on human factors is typically a long-term prediction.

Differentiating between a short-term prediction and a long-term prediction enables to separate periods with different criticalities to ensure that little or preferably no unreliable information enters predictions for critical events, which are in particular events predicted to occur within a short time span. In a short time span, the assisted driver has no or only short time to react to the predicted critical event in order to avoid the event from occurring. Human factor information may be less reliable due to the difficulty of determining mental states, which are not entirely transparent and their impact on a situation can vary substantially between individual humans. Therefore, less reliable human factor information is most advantageous for to adjust mid-term and long term predictions for future behaviors and evolvements of current scenarios in the dynamic traffic environment.

An implementation of the method may preferably use a single prediction process with a change based on the determined human factors from one point in time onwards in the prediction. The point in time or threshold separates the short-term prediction from the long-term prediction. Separating the prediction into two periods, is advantageous since, as mentioned before, the determined human factor information and the adapted prediction based thereon may be less reliable than the physical prediction alone, because mental states are not fully transparent and their impact on a situation can vary substantially between individuals and for one individual at different times. Therefore, such less reliable information is advantageously used to adjust mid- to long term predictions when implementing the method. The mid- to long term prediction can be considered to modulate the underlying physical prediction beyond a threshold time from the current time, for which the use of human factors information yields good or acceptable results for a given embodiment and scenario. The threshold time may be, e.g., 2 seconds.

In a specific example illustrated in FIG. 4, the first time ranges from 0 up to 2 seconds, and the second time starts at 2 seconds and reaches up to 10 seconds.

The center part of FIG. 4 illustrates curve characteristics of the velocity $v_A$, as predicted for a prediction time horizon. The driving assistance system supporting the driver of vehicle A uses a physical prediction process for a short-term prediction. The short-term prediction bases on kinematic parameter values, and in the illustrated example extends from a current point in time t=0 up to 2 seconds into the future.

The long-term prediction bases on kinematic parameter values and adapts the physical prediction based on determined human factors, and in the illustrated example extends starting at the future point in time t=2 seconds up to 10 seconds into the future.

In the short-term prediction, the driving assistance system in particular may predict trajectories for the vehicles A and B, their respective velocities $V_A$ and $V_B$ along the trajectories. Based on the predicted trajectories and the velocities $V_A$ and $V_B$, the driving assistance system predicts a linearly decreasing distance d for future times within the prediction time horizon. The driver assistance system concludes for the shown road traffic scenario of FIG. 4, that within the prediction time horizon of the short-term prediction, the predicted distance d will be sufficient as a safety distance between the vehicles A and B, hence no immediate danger of a crash event involving the vehicles A and B is determined in FIG. 4.

In the long-term prediction, the driver assistance system predicts a deceleration of vehicle A in order to reduce the velocity $V_A$ to a reduced velocity value that may correspond to the velocity $V_A$ of vehicle B. Hence, the driver assistance system concludes for the shown road traffic scenario of FIG. 4, that within the prediction time horizon of the long-term prediction, the predicted distance d may also suffice as a safety distance between the vehicles A and B, hence no immediate danger of a crash event involving the vehicles A and B is determined in FIG. 4, in the long-term prediction as well as in the short-term prediction.

Consequentially, the driver assistance system may dispense with generating and outputting an information including an immediate collision warning.

Figure 5:
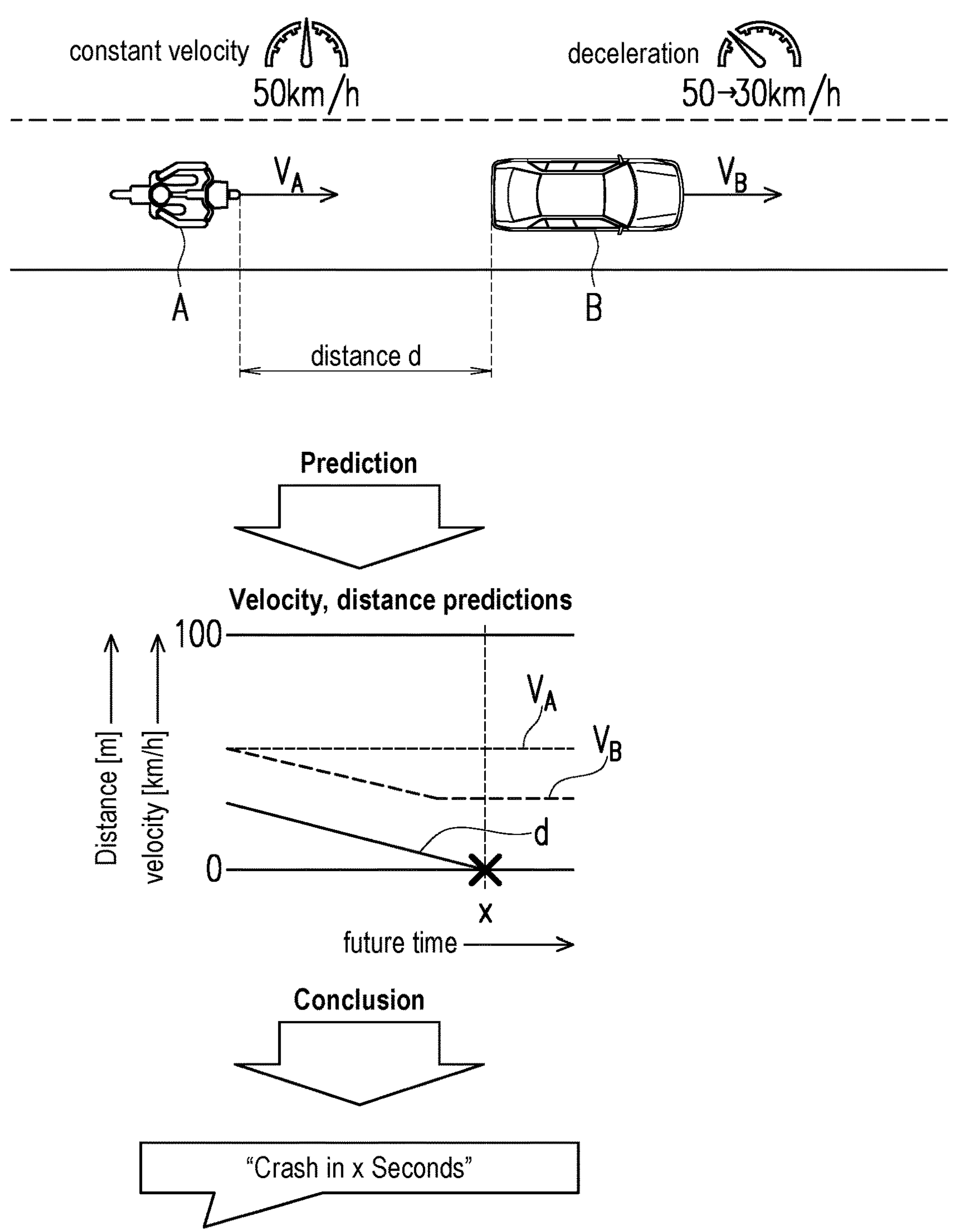
FIG. 5 shows a scenario in a road traffic environment applying an assistance method for assisting operation of an agent according to prior art.

FIG. 5 shows a scenario in a road traffic environment applying a prediction method for assisting operation of an agent according to prior art. Vehicle A is the ego-vehicle, whose driver is assisted by a driver assistance system according to prior art.

The driver assistance system of FIG. 5 may be a distance warning system or be part of an adaptive cruise control system.

The depicted road traffic scenario in the upper part of FIG. 5 includes the ego-vehicle A moving with a constant velocity $V_A$ along a lane of a road. In front of the ego-vehicle A in driving direction of vehicle A, another vehicle B is moving with a velocity $V_B$ on the same lane in the same direction as vehicle A. The distance between the vehicle A and the vehicle B is $d_0$ at a time t=0.

The other vehicle B decelerates with a constant deceleration rate from a first velocity $V_B$=50 km/h to a second velocity $V_B$=30 km/h.

The driver assistance system supporting the driver of vehicle A analyzes the traffic scenario of FIG. 5 based on the information acquired by sensors 2, 3 from the environment describing the depicted traffic scenario of FIG. 5 and predict a future evolvement of the traffic scenario. The center part of FIG. 5 illustrates curve characteristics of the velocities $V_A$, $V_B$, and of the distance d as predicted for a prediction time horizon. The driving assistance system in particular predicts trajectories for the vehicles A and B, their respective velocities $V_A$ and $V_B$ along the trajectories. Based on the predicted trajectories and the velocities $V_A$ and $V_B$, the driving assistance system predicts a linearly decreasing distance d for future times within the prediction time horizon. The driver assistance system concludes for the shown road traffic scenario of FIG. 5, that within the prediction time horizon, the predicted distance d will reach 0 m, resulting in a crash including vehicle A running into the tail end of vehicle B. Consequentially, the driver assistance system generates and outputs the information "crash in x seconds".

The driver assistance system may communicate generated and output information to the driver of vehicle A via a human machine interface. Alternatively or additionally, the driver assistance system may control actuators, e.g., a apply a brake or adapt an accelerator setting of vehicle A in order to decelerate vehicle A for avoiding the predicted crash event.

In current driver assistance systems, the predicted evolvement of the traffic scenario neglects the human element and relies solely on the kinematic relations and measurable physical parameters, in the example of FIG. 5, the velocities $v_A$, $V_B$, and the distance d. In particular for a prediction for long time horizons (long-term prediction), e.g. for time horizons exceeding 2 seconds contrary to short-term predictions, the human element may influence the future evolvement of the current traffic scenario significantly.

Figure 6:
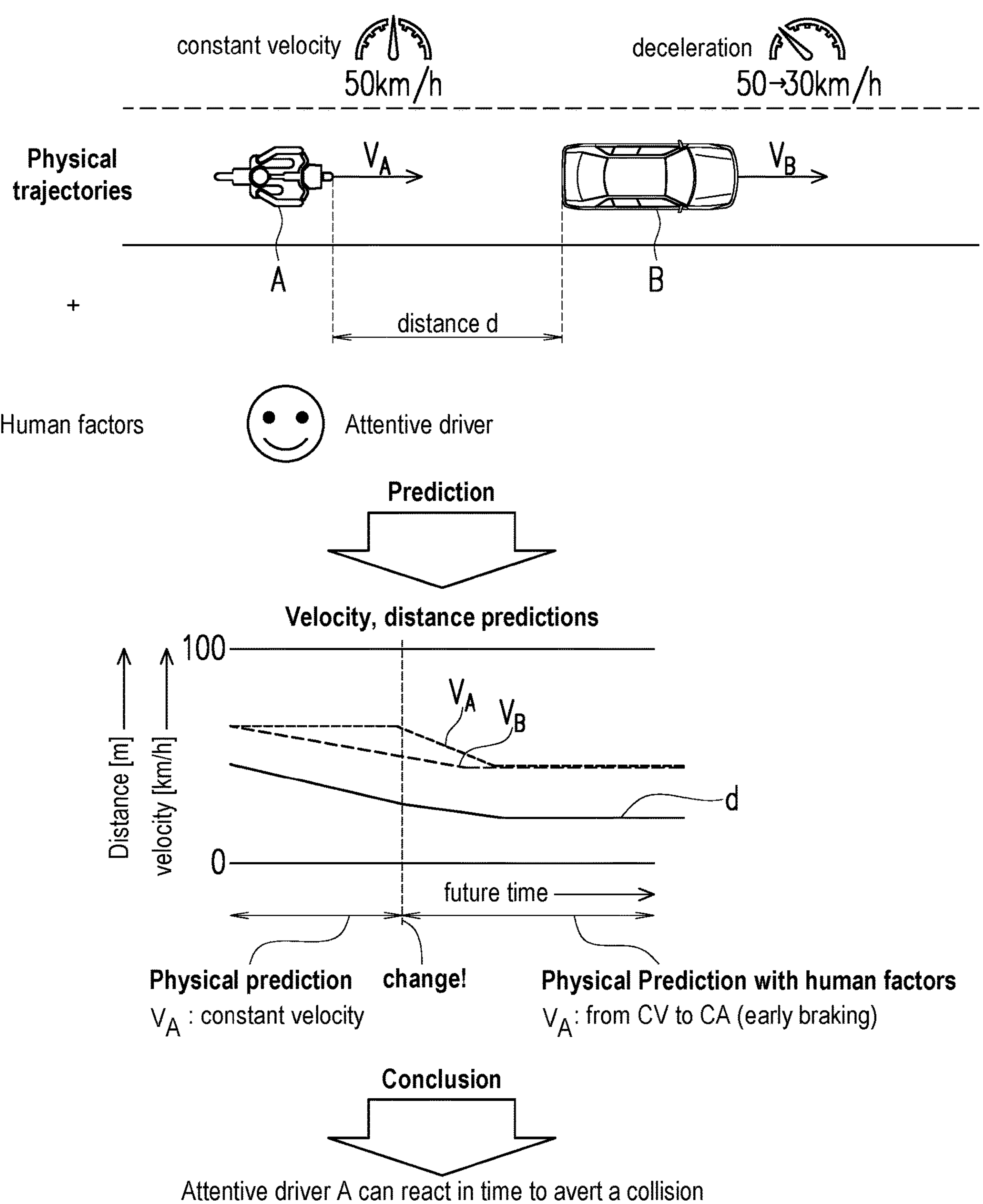
FIG. 6 illustrates a further application example of the assistance method with human factors for assisting operation of an agent in the road traffic environment.

FIG. 6 illustrates an application of the computer-implemented method applying a prediction with human factors for assisting operation of an agent in the road traffic environment.

The driver assistance system of FIG. 6 may be a distance warning system or be part of an adaptive cruise control system. Vehicle A is the ego-vehicle, whose driver is assisted by a driver assistance system according to prior art.

Figure 9:
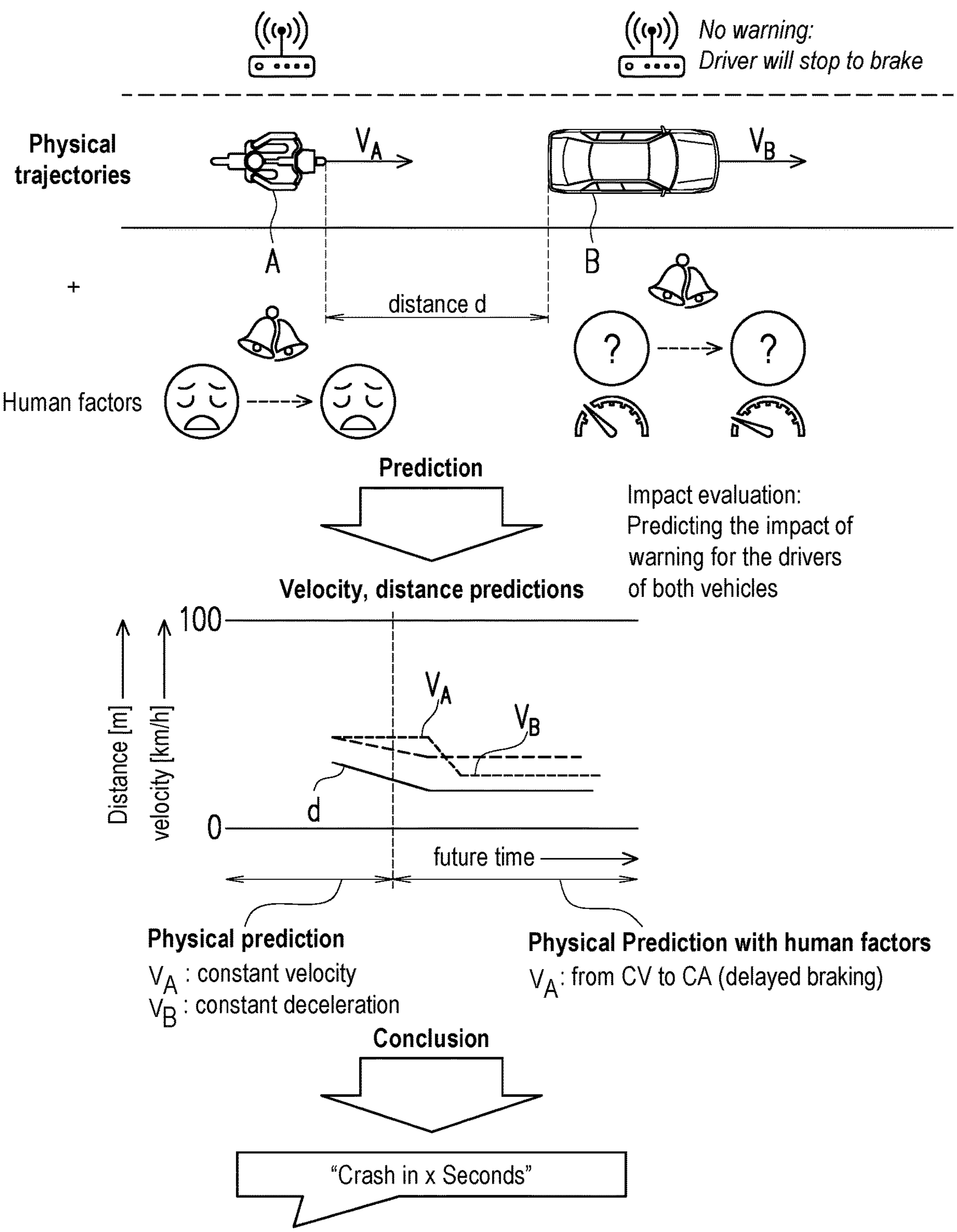
FIG. 9 illustrates the further embodiment performing impact evaluation using human factors of the assistance method with human factors for assisting operation of an agent in the road traffic environment in an alternative scenario.

The depicted road traffic scenario in the upper part of FIG. 9 includes the ego-vehicle A moving with a constant velocity $V_A$ along a lane of a road. In front of the ego-vehicle A in driving direction of vehicle A, another vehicle B is moving with a velocity $V_B$ on the same lane in the same direction as vehicle A. The distance between the vehicle A and the vehicle B is $d_0$ at a time t=0. The other vehicle B decelerates with a constant deceleration rate from a first velocity $V_B$=50 km/h to a second velocity $V_B$=30 km/h.

The driver assistance system supporting the driver of vehicle A analyzes the traffic scenario of FIG. 6 based on the information acquired by sensors 2, 3 from the environment describing the depicted traffic scenario of FIG. 6 and predicts a future evolvement of the traffic scenario. The prediction according to an embodiment of the computer-implemented method includes a physical prediction for a first prediction time horizon. The prediction according to the embodiment of the computer-implemented method includes a physical prediction, which is adapted based on human factors for a time that ranges from first prediction time horizon to the second prediction time horizon. The second prediction time horizon exceeds the first prediction horizon.

The application scenario of FIG. 6 assumes the human factor for adapting the physical prediction to be a driver state of the driver of the ego-vehicle A. In particular, the driver of the ego-vehicle has the driver state of an attentive driver.

The center part of FIG. 6 illustrates curve characteristics of the velocities $v_A$, $V_B$, and of the distance d as predicted for a prediction time horizon. The driving assistance system, performing the prediction using a physical prediction in particular predicts trajectories for the vehicles A and B, their respective velocities $V_A$ and $V_B$ along the trajectories. A shown in the center part of FIG. 6, the driver assistance system predicts until the first prediction horizon elapses based on the physical prediction for the constant velocity $V_A$ of the ego-vehicle A, the distance d between the ego-vehicle A and the other vehicle B is linearly decreasing due the decrease in velocity $V_B$ of the other vehicle B. However, the distance d for the first prediction horizon remains larger than 0 m, so that the driver assistance system concludes that there is no danger of a collision event occurring over the first prediction horizon based on the short-term prediction including a physical prediction.

The driver assistance system performs the long-term prediction over times between the first prediction horizon and the second prediction horizon based on a driver state of the driver of the ego-vehicle A of an attentive driver. The attentive driver is considered to being capable to react in time to avert a collision event between the ego-vehicle A and the other vehicle B. In particular, the assistance system considers the driver to change early from a constant velocity $V_A$ of the ego-vehicle A to decelerating, e.g., by applying the brakes of the ego-vehicle A. Based on the predicted trajectories and the velocities $V_A$ and $V_B$, the driving assistance system predicts for the times between the first prediction time horizon and the second prediction time horizon a further decreasing distance d for future times until the velocity $V_A$ of the ego-vehicle A is equal to the velocity $V_B$ of the other vehicle B for future times within the second the second prediction time horizon. For the remainder of future times during the second prediction horizon, the long-term prediction will conclude that the distance d will remain constant but larger than 0 m due to the velocities $V_A$ and $V_B$ being equal. The driver assistance system concludes for the shown road traffic scenario of FIG. 6, that within the second prediction time horizon for the long-term prediction, the predicted distance d will never reach 0 m, Consequentially, the driver assistance system does not generate and output the information "crash in x seconds", as taking into account the human factor of an attentive driver of the ego-vehicle A, the driver of the ego-vehicle A can react in time and avoid a collision event involving the ego-vehicle A and the other vehicle B. An unnecessary warning of the driver of the ego-vehicle A is therefore avoided by the computer-implemented method according to the embodiment.

Contrary thereto, in current driver assistance systems, the predicted evolvement of the traffic scenario neglects the human element and relies solely on the kinematic relations and measurable physical parameters, in the example of FIG. 6, the velocities $v_A$, $V_B$, and the distance d. In particular for a prediction for long time horizons (long-term prediction), e.g. for time horizons exceeding 2 seconds contrary to short-term predictions, the human element influences the future evolvement of the current traffic scenario significantly.

Figure 7:
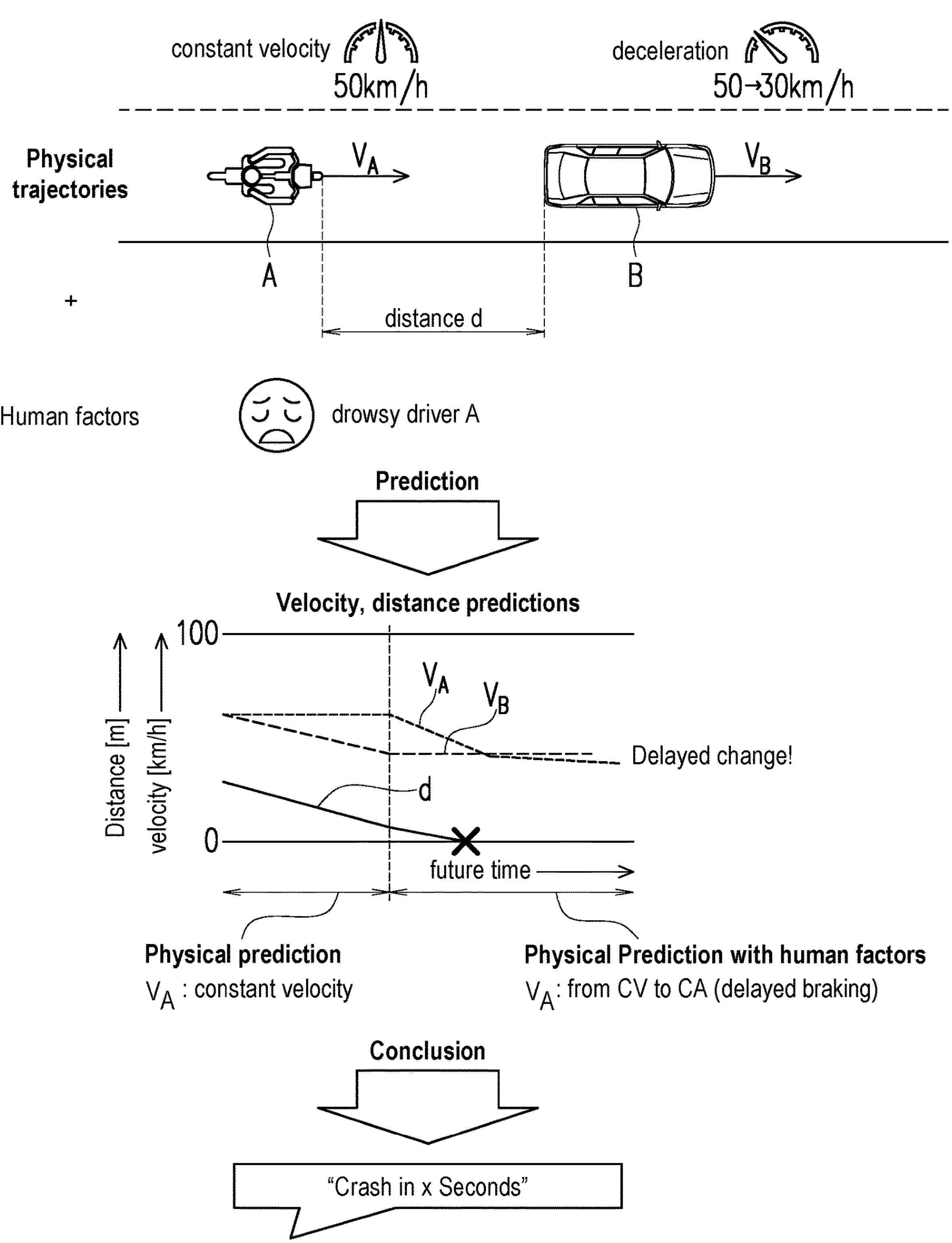
FIG. 7 illustrates an alternate application example of the assistance method with human factors for assisting operation of an agent in the road traffic environment.

FIG. 7 illustrates an alternate scenario for the application of the computer-implemented method applying a prediction with human factors for assisting operation of an agent in the road traffic environment.

The driver assistance system of FIG. 7 is the distance warning system or part of an adaptive cruise control system as discussed with reference to FIG. 6. Vehicle A is the ego-vehicle, whose driver is assisted by a driver assistance system according to prior art.

The depicted road traffic scenario in the upper part of FIG. 7 corresponds to the traffic scenario of FIGS. 5 and 6, which includes the ego-vehicle A moving with a constant velocity $V_A$ along a lane of a road. In front of the ego-vehicle A in driving direction of vehicle A, another vehicle B is moving with a velocity $V_B$ on the same lane in the same direction as vehicle A. The distance between the vehicle A and the vehicle B is $d_0$ at a time t=0. The other vehicle B decelerates with a constant deceleration rate from a first velocity $V_B$=50 km/h to a second velocity $V_B$=30 km/h.

The traffic scenario of FIG. 7 includes, as in FIG. 7, the human factor for adapting the physical prediction to be a driver state of the driver of the ego-vehicle A. Contrary to the scenario of FIG. 6, the driver of the ego-vehicle A has the driver state of a drowsy driver.

The driver assistance system supporting the driver of vehicle A analyzes the traffic scenario of FIG. 7 based on the information acquired by sensors 2, 3 from the environment describing the depicted traffic scenario of FIG. 6 and predicts a future evolvement of the traffic scenario. The prediction according to an embodiment of the computer-implemented method includes a physical prediction for a first prediction time horizon. The prediction according to the embodiment of the computer-implemented method includes a physical prediction, which is adapted based on human factors for a time that ranges from first prediction time horizon to the second prediction time horizon. The second prediction time horizon exceeds the first prediction horizon.

The application scenario of FIG. 6 assumes the human factor for adapting the physical prediction to be a driver state of the driver of the ego-vehicle A. In particular, the driver of the ego-vehicle A has the driver state of an attentive driver.

The center part of FIG. 7 illustrates curve characteristics of the velocities $v_A$, $V_B$, and of the distance d as predicted for a prediction time horizon. The driving assistance system, performing the prediction using a physical prediction in particular predicts trajectories for the vehicles A and B, their respective velocities $V_A$ and $V_B$ along the trajectories. In the center part of FIG. 7, the driver assistance system predicts until the first prediction horizon elapses based on the physical prediction for the constant velocity $V_A$ of the ego-vehicle A, the distance d between the ego-vehicle A and the other vehicle B is linearly decreasing due the decrease in velocity $V_B$ of the other vehicle B. However, the distance d for the first prediction horizon remains larger than 0 m, so that the driver assistance system concludes that there is no danger of a collision event occurring over the first prediction horizon based on the short-term prediction including a physical prediction.

The driver assistance system performs the long-term prediction over times between the first prediction horizon and the second prediction horizon based on a driver state of the driver of the ego-vehicle A being a drowsy driver. The drowsy driver is considered to fail to react in time to avert a collision event between the ego-vehicle A and the other vehicle B. In particular, the assistance system considers the driver to change late from a constant velocity $V_A$ of the ego-vehicle A to decelerating, e.g., by applying the brakes of the ego-vehicle A. Based on the predicted trajectories and the velocities $V_A$ and $V_B$, the driving assistance system predicts for the times between the first prediction time horizon and the second prediction time horizon a further decrease distance d for future times until the velocity $V_A$ of the ego-vehicle A is equal to the velocity $V_B$ of the other vehicle B for future times within the second the second prediction time horizon. The driver assistance system concludes for the shown road traffic scenario of FIG. 7, that within the second prediction time horizon for the long-term prediction, the predicted distance d will reach 0 m. Consequentially, the driver assistance system does generate and output the information "crash in x seconds", as taking into account the human factor of the drowsy driver of the ego-vehicle A, the driver of the ego-vehicle A reacts too late and will not prevent the distance d from reaching 0. Hence, the assistance system predicts in the long-term evolution of the traffic scenario of FIG. 7, a collision event involving the ego-vehicle A and the other vehicle B to be likely to occur. The computer-implemented method according to the embodiment accordingly generates and outputs a respective warning to the driver of the ego-vehicle A in order to give him enough time to prevent the predicted collision event in spite of his drowsy state.

Contrary thereto, in current driver assistance systems, the predicted evolvement of the traffic scenario neglects the human element and relies solely on the kinematic relations and measurable physical parameters, in the example of FIG. 7, the velocities $v_A$, $V_B$, and the distance d.

Figure 8:
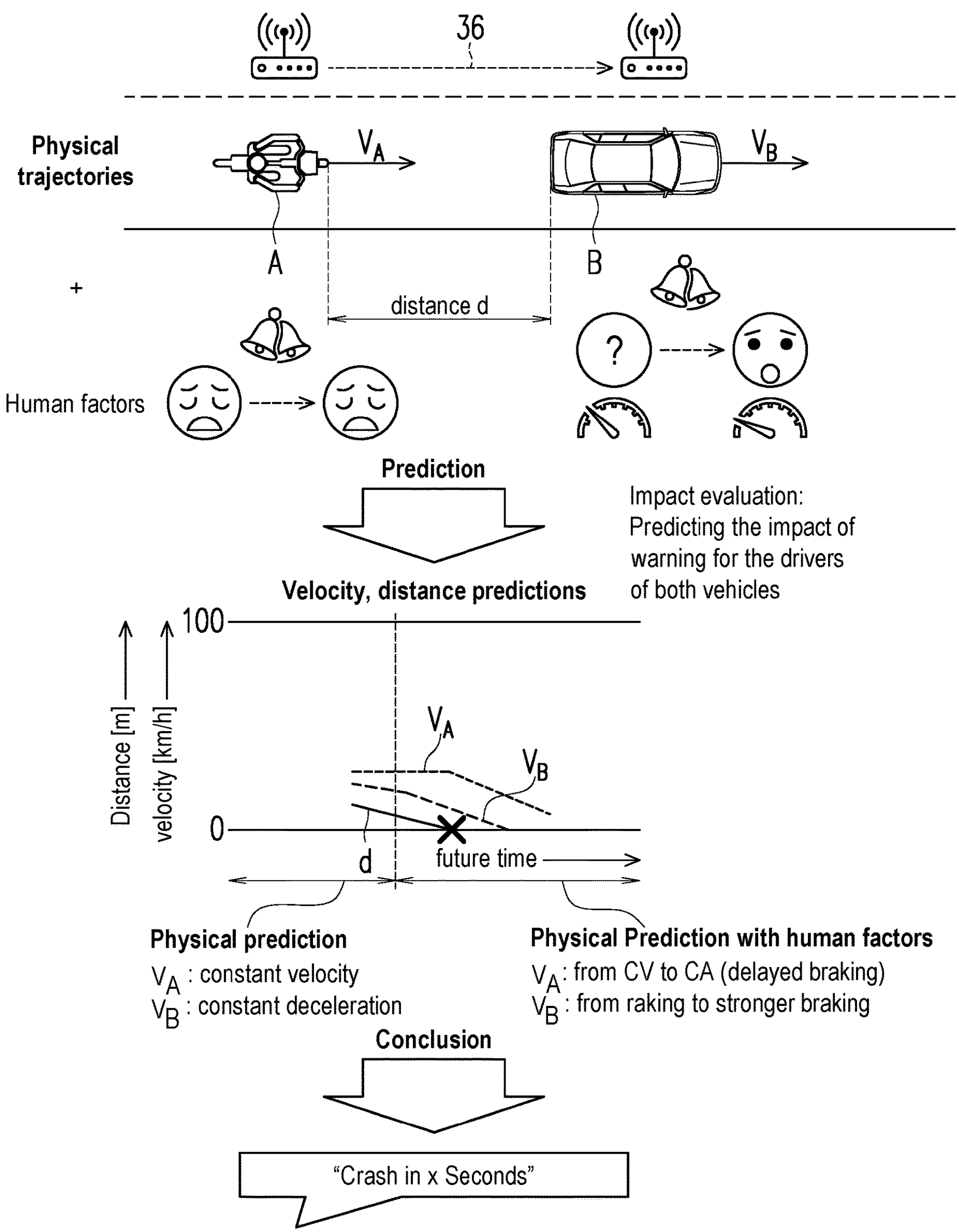
FIG. 8 illustrates a further embodiment performing impact evaluation using human factors of the assistance method with human factors for assisting operation of an agent in the road traffic environment.

FIG. 8 illustrates an embodiment of the computer-implemented method performing impact evaluation using human factors of the prediction method with human factors for assisting operation of an agent in the road traffic environment.

The driver assistance system of FIG. 8 is the distance warning system or part of an adaptive cruise control system as discussed with reference to FIGS. 6 and 7. Vehicle A is the ego-vehicle, whose driver is assisted by a driver assistance system implementing the computer-implemented method according to an embodiment.

The depicted road traffic scenario in the upper part of FIG. 8 corresponds to the traffic scenario of FIGS. 5, 6 and 7, which includes the ego-vehicle A moving with a constant velocity $V_A$ along a lane of a road. In front of the ego-vehicle A in driving direction of vehicle A, another vehicle B is moving with a velocity $V_B$ on the same lane in the same direction as vehicle A. The distance between the vehicle A and the vehicle B is $d_0$ at a time t=0. The other vehicle B decelerates with a constant deceleration rate from a first velocity $V_B$=50 km/h to a second velocity $V_B$=30 km/h.

The traffic scenario of FIG. 7 includes, as in FIG. 7, the human factor for adapting the physical prediction to be a driver state of the driver of the ego-vehicle A. Contrary to the scenario of FIG. 6, the driver of the ego-vehicle A has the driver state of a drowsy driver.

The driver of the ego-vehicle A is classified as being a drowsy driver or being in a drowsy driver state. Both the ego-vehicle and the other vehicle B of FIG. 8 include a communication module 26 as discussed with reference to FIG. 3. The driver assistance system of the ego-vehicle A may transmit a communication signal 36 to the other vehicle B. The communication signal may include a warning of a predicted collision event involving the ego-vehicle A and the other vehicle B. The driver assistance system of the ego-vehicle A may output the warning via a human machine interface, e.g., the output module 28, to the driver of the ego-vehicle A. The other vehicle B may also include a driver assistance system, which is configured to generate and output a corresponding warning to a driver of the other vehicle B based on the received communication signal 36 communicated by the assistance system of the ego-vehicle A.

As discussed with reference to FIG. 7, the assistance system predicts in the long-term evolution of the traffic scenario of FIG. 9, a collision event involving the ego-vehicle A and the other vehicle B to be likely to occur. The computer-implemented method according to the embodiment accordingly generates and outputs a respective warning to the driver of the ego-vehicle A in order to give him enough time to prevent the predicted collision event in spite of his drowsy state.

Furthermore, the driver assistance system in FIG. 9 estimates the impact of a warning of the driver of the ego-vehicle A and of the other vehicle B.

In particular, the driver assistance system estimates a positive impact of outputting a warning signal to the driver of the ego-vehicle A, as the driver of the ego-vehicle A is assumed to brake after taking note of the warning. The ego-vehicle A can be expected to decelerate in response to outputting the warning to the drowsy driver, although the braking is late.

The driver assistance system assumes a negative impact for outputting the warning signal to the driver of the other vehicle B, as the driver of the other vehicle B is assumed to be surprised by the sudden warning resulting from the communicating the predicted collision event from his rear, and not predicted by his own driver assistance system. The ego-vehicle B can be expected to decelerate even stronger in response to outputting the warning to its driver. The driver of the other vehicle B brakes longer due to warning, or may change from braking to braking with an increased deceleration value because the output warning surprises the driver of the other vehicle B.

The driver assistance system accordingly determines to generate and output a warning to the driver of the ego-vehicle A in order mitigate the risk of the predicted collision event involving the ego-vehicle A and the other vehicle B from the long-term prediction using the physical prediction with an adapted predicted behavior based on human factors. The assistance system of FIG. 8 applies the computer-implemented method estimating the impact of a warning of both drivers including the ego-vehicle A and the other vehicle B both involved in a predicted collision event in the shared road traffic environment.

Generally, communicating the generated signal, or an event to another agent is advantageous. In an embodiment, the human model 8 is configured to not only assess current mental states of a human, but also creates and updates individual driver profiles for human drivers of vehicles. The assistance system may share and update the generated driver profiles with other participants in a V2X network. In a specific scenario, an assistance system identifies that a first vehicle is closely driving behind (tailgating) another (second) vehicle which drives in front of the first vehicle on the same lane in the same direction. The assistance system may alert the driver of the first vehicle to the close distance to the second vehicle. However, due to manual driving, the assistance system cannot ensure that the driver of the first vehicle will improve his driving behavior accordingly and increase the distance to the second vehicle to a level generally accepted as a safe distance. In this specific scenario, the assistance system may further increase traffic safety by to let other vehicles partially compensate for the safety reduction in the overall traffic scenario due to the small distance between the first and the second vehicle by increasing safety margins in their respective predicted behavior. However, the reactions of other human drivers in such driving scenarios including vehicles, which do not maintain sufficient safety distances, may vary and are not uniform. Some human drivers may react to information about a vehicle that follows the ego-vehicle with maintaining sufficient distance from a safety point of view (tailgater) by accelerating and possibly even decreasing the distance to another vehicle driving in front of the ego-vehicle below a safe distance themselves, thus becoming tailgaters, too. Hence outputting information on a tailgating vehicle to such a driver would be likely to reduce overall traffic safety. Yet other drivers might react to receiving information on a tailgating other vehicle by increasing the distance to a vehicle driving in front of their vehicle themselves. Behaving in this way allows them to brake more slowly in case of a detecting an event to their front. In consequence, the tailgating vehicle behind the ego-vehicle in turn has more time to react in case of the ego-vehicle suddenly braking. In consequence, communicating information on specific human factors, mental states, and individual driver profiles in specific embodiments of the communication signal 36 increases traffic safety in particular in combination with the adapting the predicted behavior of the assistance system according to the embodiments of the computer-implemented method. Hence deciding a distribution of information, or alternatively of not distributing the information becomes contingent on knowledge about an individual driver's typical reactions. The driver's typical reactions may initially be based on a predetermined average behavior for human drivers, and subsequently be updated and improved as more data about the driver's individual human factors is acquired. In addition to this human driver model from past driving behavior also current mental states can be taken into consideration in the human factor information.

Contrary to the application scenario shown in FIG. 8, FIG. 9 shows an application scenario in which only the impact of the warning output on the driver of the ego-vehicle A is estimated and taken into account.

FIG. 9 illustrates the embodiment of the computer-implemented method performing impact evaluation using human factors of the prediction with human factors for assisting operation of an agent in the road traffic environment. The assistance system of FIG. 9 is the distance warning system or part of an adaptive cruise control system as discussed with reference to FIGS. 6, 7, and 8. Vehicle A is the ego-vehicle A, whose driver is assisted by a driver assistance system implementing the computer-implemented method according to an embodiment.

The depicted road traffic scenario in the upper part of FIG. 9 corresponds to the traffic scenario of FIGS. 5, 6, 7, and 8, which includes the ego-vehicle A moving with a constant velocity $V_A$ along a lane of a road. In front of the ego-vehicle A in driving direction of vehicle A, the other vehicle B is moving with a velocity $V_B$ on the same lane into the same direction as vehicle A. The distance between the vehicle A and the vehicle B is $d_0$ at a time t=0. The assistance system predicts the other vehicle B to decelerate with a constant deceleration rate from a first velocity $V_B$=50 km/h to a second velocity $V_B$=30 km/h.

The traffic scenario of FIG. 9 includes, as in FIG. 8, the human factor for adapting the physical prediction to be a driver state of the driver of the ego-vehicle A. As in the scenario of FIG. 8, the driver of the ego-vehicle A is determined to have the driver state of a drowsy driver. The driver of the ego-vehicle A is classified as being a drowsy driver or being in a drowsy driver state. Contrary to the embodiment of FIG. 8, the driver assistance system of the ego-vehicle A may transmit a communication signal 36 to the other vehicle B. The communication signal may include a warning of a predicted collision event involving the ego-vehicle A and the other vehicle B. The driver assistance system of the ego-vehicle A may output the warning via a human machine interface, e.g., the output module 28, to the driver of the ego-vehicle A.

As discussed with reference to FIGS. 7 and 8, the assistance system predicts in the long-term evolution of the traffic scenario of FIG. 9, a collision event involving the ego-vehicle A and the other vehicle B to be likely to occur. The computer-implemented method according to the embodiment accordingly generates and outputs a respective warning to the driver of the ego-vehicle A in order to give him enough time to prevent the predicted collision event in spite of his drowsy state.

Furthermore, the assistance system estimates and impact of outputting the warning of the predicted collision event to the driver of the ego-vehicle A.

In particular, the driver assistance system estimates a positive impact of outputting a warning signal to the driver of the ego-vehicle A, as the driver of the ego-vehicle A is assumed to brake after taking note of the warning of the predicted collision. The ego-vehicle A can be expected to decelerate in response to outputting the warning to the drowsy driver, although the braking is late. The prediction of behaviors of the go-vehicle A and the other vehicle B in the center part of FIG. 9 reflects the effect of the delayed deceleration of the ego-vehicle A in response to the output warning of the predicted collision involving the ego-vehicle A and the other vehicle B.

The driver assistance system assumes a negative impact for outputting the warning signal to the driver of the other vehicle B, as the driver of the other vehicle B is assumed to be surprised by the sudden warning resulting from the communicating the predicted collision event from his rear, and not predicted by his own driver assistance system. The ego-vehicle B can be expected to decelerate even stronger in response to outputting the warning to its driver. The driver of the other vehicle B brakes longer due to warning, or may change from braking to braking with an increased deceleration value because the output warning surprises the driver of the other vehicle B.

The driver assistance system accordingly determines to generate and output a warning to the driver of the ego-vehicle A in order mitigate the risk of the predicted collision event involving the ego-vehicle A and the other vehicle B from the long-term prediction using the physical prediction with an adapted predicted behavior based on human factors. The assistance system of FIG. 9 applies the computer-implemented method estimating the impact of a warning of the drivers of the ego-vehicle A, for example via outputting an acoustic warning via a loudspeaker to the driver of the ego-vehicle A involved in a predicted collision event in the shared road traffic environment. The probability of the predicted crash event occurring will be advantageously low due to the long-term prediction including adaption based on human factors despite the slow reaction time for the driver of the ego-vehicle A due to his slow reaction to the output warning via the human machine interface of the ego-vehicle A.

Figure 10:
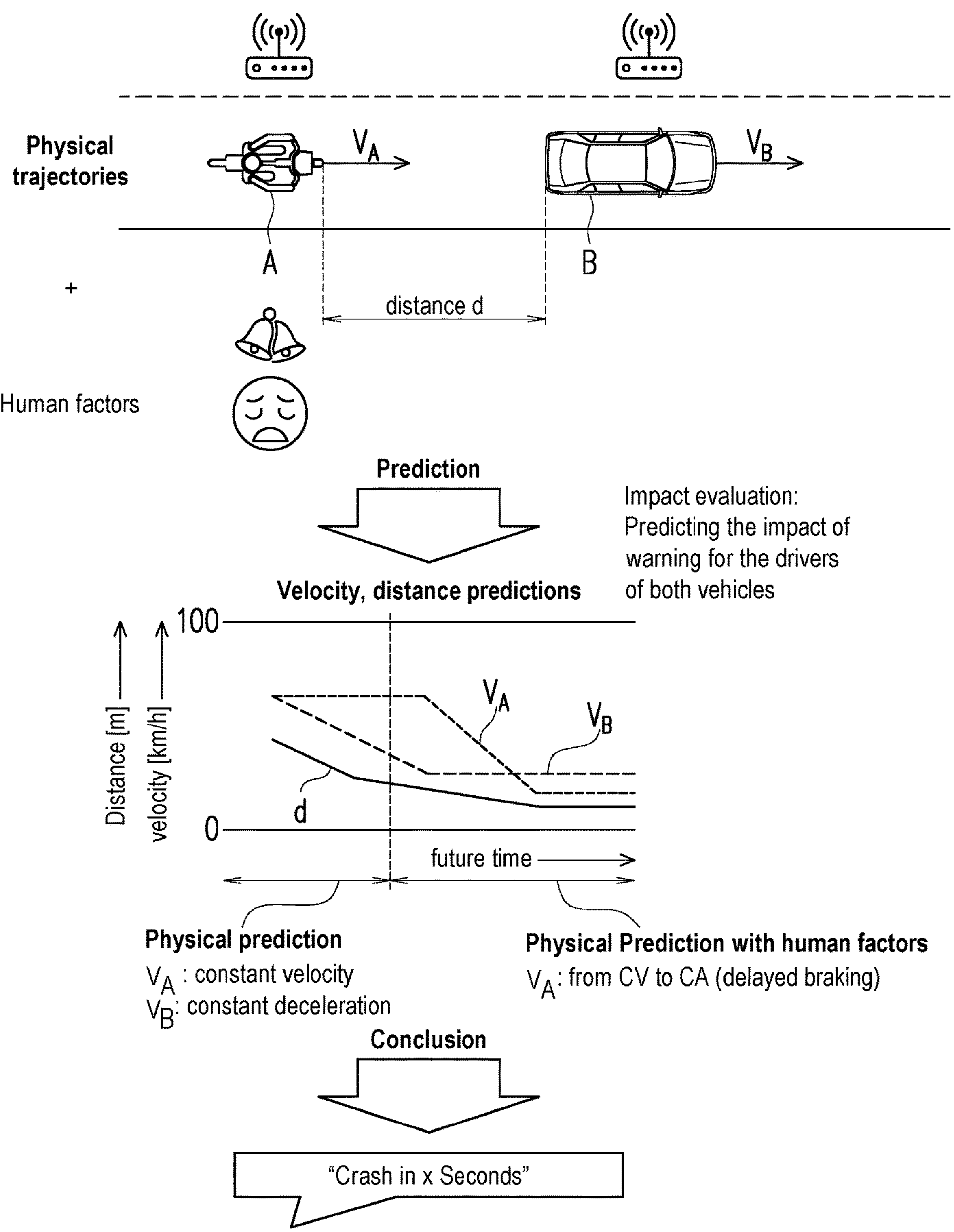
FIG. 10 illustrates the further embodiment performing impact evaluation using human factors of the assistance method with human factors for assisting operation of an agent in the road traffic environment in an alternative scenario.

FIG. 10 illustrates the second embodiment performing impact evaluation using human factors of the prediction method with human factors for assisting operation of an agent in the road traffic environment in an alternate scenario to FIGS. 8 and 9.

FIG. 10 illustrates the embodiment of the computer-implemented method performing impact evaluation using human factors of the prediction with human factors for assisting operation of an agent in the road traffic environment. The driver assistance system of FIG. 10 is the distance warning system or part of an adaptive cruise control system as discussed with reference to FIGS. 6, 7, 8, and 9. Vehicle A is the ego-vehicle A, whose driver is assisted by a driver assistance system implementing the computer-implemented method according to an embodiment.

The depicted road traffic scenario in the upper part of FIG. 10 corresponds to the traffic scenario of FIGS. 5, 6, 7, 8, and 9, which includes the ego-vehicle A moving with a constant velocity $V_A$ along a lane of a road. In front of the ego-vehicle A in driving direction of vehicle A, the other vehicle B is moving with a velocity $V_B$ on the same lane into the same direction as vehicle A. The distance between the vehicle A and the vehicle B is $d_0$ at a time t=0. The assistance system predicts the other vehicle B to decelerate with a constant deceleration rate from a first velocity $V_B$=50 km/h to a second velocity $V_B$=30 km/h.

The traffic scenario of FIG. 10 includes, as in FIGS. 8 and 9, the human factor for adapting the physical prediction to be a driver state of the driver of the ego-vehicle A. As in the scenario of FIGS. 8 and 9, the driver of the ego-vehicle A is determined to have the driver state of a drowsy driver. The driver of the ego-vehicle A is classified as being a drowsy driver or being in a drowsy driver state. As in the scenario of FIG. 9, the driver assistance system of the ego-vehicle A has the capability to transmit a communication signal 36 to the other vehicle B. The communication signal may include a warning of a predicted collision event involving the ego-vehicle A and the other vehicle B. The driver assistance system of the ego-vehicle A may output the warning via a human machine interface, e.g., the output module 28, to the driver of the ego-vehicle A.

As discussed with reference to FIGS. 7, 8, and 9, the assistance system predicts in the long-term evolution of the traffic scenario of FIG. 10, a collision event involving the ego-vehicle A and the other vehicle B to be likely to occur. The computer-implemented method according to the embodiment accordingly generates and outputs a respective warning to the driver of the ego-vehicle A in order to give him enough time to prevent the predicted collision event in spite of his drowsy state.

Furthermore, the assistance system estimates an impact of outputting the warning of the predicted collision event to the driver of the ego-vehicle A.

In particular, the driver assistance system estimates a positive impact of outputting a warning signal to the driver of the ego-vehicle A, as the driver of the ego-vehicle A is assumed to brake after taking note of the warning of the predicted collision. The ego-vehicle A can be expected to decelerate in response to outputting the warning to the drowsy driver, although the braking is late. The prediction of behaviors of the go-vehicle A and the other vehicle B in the center part of FIG. 9 reflects the effect of the delayed deceleration of the ego-vehicle A in response to the output warning of the predicted collision involving the ego-vehicle A and the other vehicle B.

The driver assistance system assumes a negative impact for outputting the warning signal to the driver of the other vehicle B, as the driver of the other vehicle B is assumed to be surprised by the sudden warning resulting from the communicating the predicted collision event from his rear, and not predicted by his own driver assistance system. The ego-vehicle B can be expected to decelerate even stronger in response to outputting the warning to its driver. The driver of the other vehicle B brakes longer due to warning, or may change from braking to braking with an increased deceleration value because the output warning surprises the driver of the other vehicle B.

The driver assistance system accordingly determines to generate and output a warning to the driver of the ego-vehicle A only in order mitigate the risk of the predicted collision event involving the ego-vehicle A and the other vehicle B from the long-term prediction using the physical prediction with an adapted predicted behavior based on human factors. Contrary to the embodiment of the computer-implemented method in the traffic scenario of FIG. 8, the assistance system further determines to only alert the driver of the ego-vehicle A and decides against communication of information for vehicle B due to a predicted negative impact of warning the driver of the other vehicle B.

In particular, the driving assistance system evaluates an impact of outputting a warning to the driver of the ego-vehicle A and of outputting a warning to the driver of the other vehicle B based on human factors.

Based on the evaluated impacts of outputting a warning to the driver of the ego-vehicle A and of outputting a warning to the driver of the other vehicle B based on human factors, the driving assistance system determines to alert those agents whose response is likely to affect the predicted evolvement of the traffic scenario positively.

Based on the evaluated impacts of outputting a warning to the driver of the ego-vehicle A and of outputting a warning to the driver of the other vehicle B based on human factors, the driving assistance system may determine to adapt a strength and a modality of the output warning via the output module 28 depending on the estimated probability of the predicted collision event (crash likelihood).

The improved prediction process according to an embodiment of the computer-implemented method using and adaption of the prediction based on human factors may be performed for both the ego agent (ego-vehicle A) and the other agent (other vehicle B).

FIG. 10 applies the computer-implemented method estimating the impact of a warning of the drivers of the ego-vehicle A, for example via outputting an acoustic warning via a loudspeaker to the driver of the ego-vehicle A involved in a predicted collision event in the shared road traffic environment. The probability of the predicted crash event occurring will be advantageously low due to the long-term prediction including adaption based on human factors despite the slow reaction time for the driver of the ego-vehicle A due to his slow reaction to the output warning via the human machine interface of the ego-vehicle A.

All features described above or features shown in the figures can be combined with each other in any advantageous manner within the scope of the disclosure. In the detailed discussion of embodiments, numerous specific details were presented for providing a thorough understanding of the invention defined in the claims. It is evident that putting the claimed invention into practice is possible without including all the specific details.

In the specification and the claims, the expression "at least one of A and B" may replace the expression "A and/or B" and vice versa due to being used with the same meaning. The expression "A and/or B" means "A, or B, or A and B".

What is claimed is:

1. A computer-implemented method in a system for assisting an agent operating a vehicle in a dynamic environment, the system comprising at least one processor and at least one sensor, wherein at least one other agent is in the environment, the method comprising steps of:

obtaining, by the at least one sensor, sensor information on the environment of the agent; and, by the at least one processor, predicting at least one behavior of at least one of the agent and the at least one other agent based on the obtained sensor information;

determining at least one human factor relevant for the predicted at least one behavior;

adapting the predicted at least one behavior based on the determined human factor;

determining whether a communication of at least one of an event resulting from the predicted at least one behavior or one of the predicted behaviors based on the adapted at least one behavior is beneficial to the operating of the agent, wherein determining whether the communication is beneficial to the agent and the at least one other agent includes predicting and simulating behavior variations of the agent and the at least one other agent in response to a plurality of communication candidates, and determining for each communication candidate an effect of outputting the communication to the agent or the at least one other agent, and selecting the communication candidate or a combination of communication candidates based on the determined effects of the communication candidates that reduce a situation risk of the current scenario in the environment;

generating a signal based on the adapted at least one behavior in case of determining that the communication is beneficial, and communicating the event or at least one of the predicted behaviors based on the generated signal to the agent for assisting the agent in operating with a reduced situation risk in the environment; and controlling, by the system, at least one actuator of the vehicle based on the generated signal for assisting the agent in operating in the dynamic environment based on the at least one adapted behavior, wherein the at least one actuator of the vehicle is controlled to execute at least one of an adapted longitudinal and lateral behavior of the vehicle in the dynamic environment.

2. The computer-implemented method according to claim 1, wherein the method comprises determining, based on the adapted at least one behavior, at least one event involving the agent;

estimating a risk associated with signaling information on the determined at least one event to the agent;

adapting the adapted behavior further based on the estimated risk associated with signaling the information on the determined at least one event to the agent;

determining whether the estimated risk associated with signaling the information on the determined at least one event to the agent decreases based on the further adapted behavior;

generating and outputting the signal based on the further adapted at least one behavior in case of determining that the estimated risk has decreased.

3. The computer-implemented method according to claim 2, wherein the method comprises estimating the risk associated with signaling the information on the determined at least one event includes evaluating an impact of signaling the information on at least one trajectory.

4. The computer-implemented method according to claim 2, wherein the method comprises estimating the risk associated with signaling the information on the determined at least one event includes predicting a human response to the information output in the signal, and enabling generating and outputting the signal including the information in case of determining a decrease of the estimated risk based on the predicted human response, and disabling generating and outputting the signal including the information in case of determining an increase of the estimated risk based on the predicted human response.

5. The computer-implemented method according to claim 1, wherein the determined at least one human factor includes information on at least one of the agent, the at least one other agent, a subset of or all other agents in the environment of the agent.

6. The computer-implemented method according to claim 1, wherein the method comprises adapting, based on the determined human factor, the predicted at least one behavior of at least one of the agent, the at least one other agent or all other agents in the environment of the agent.

7. The computer-implemented method according to claim 1, wherein the method comprises adapting the adapted behavior further based on the estimated risk associated with signaling the information on the determined at least one event to at least one of the agent, the at least one other agent, and all other agents in the environment of the agent.

8. The computer-implemented method according to claim 1, wherein the method comprises updating a human model based on a determined reaction of at least one of the agent and the at least one other agent based on the predicted behavior in a previous processing cycle.

9. The computer-implemented method according to claim 1, wherein the method comprises determining a weight associated with the human factor based on a certainty of the human factor, and determining an impact of the human factor on the predicted behavior based on the determined weight.

10. The computer-implemented method according to claim 1, wherein the method comprises determining at least one human factor relevant for the predicted at least one behavior includes determining in combination human factor information associated with the agent and the least one other agent to determine a combined uncertainty associated with the at least one human factor.

11. The computer-implemented method according to claim 1, wherein the method comprises determining whether the communication based on the adapted at least one behavior is beneficial to the agent and the at least one other agent includes determining whether outputting the communication for the agent and the at least one other agent at different times is beneficial, and, in case of determining that the communication at different times is beneficial, generating and outputting the generated signal to the agent and the at least one other agent at different times.

12. The computer-implemented method according to claim 1, wherein the method comprises determining whether the communication based on the adapted at least one behavior is beneficial to the agent and the at least one other agent includes determining whether outputting the communication to the agent adversely affects the at least one other agent.

13. The computer-implemented method according to claim 1, wherein the method comprises communicating the generated signal to the at least one other agent for output via an human-machine interface of the at least one other agent.

14. The computer-implemented method according to claim 1, wherein the method comprises predicting the at least one behavior of at least one of the agent or the at least one other agent based on the obtained sensor information over a first time into the future using a physical prediction, and predicting the at least one behavior and adapting the predicted at least one behavior based on the determined human factor over a second time into the future, wherein the first time is shorter than the second time.

15. The computer-implemented method according to claim 14, wherein the method comprises the physical prediction includes a longitudinal behavior comprising at least one of a constant velocity, a constant deceleration or a constant acceleration, and a delayed constant acceleration, the physical prediction includes a lateral behavior comprising at least one of moving with a constant turning angle, a movement along map paths, a lane change, and taking a left path, a straight path or a right path at an intersection, the physical prediction includes environmental parameters comprising a road inclination angle, a road curve radius, predicting the at least one behavior and adapting the predicted at least one behavior includes a longitudinal behavior comprising at least one of a behavior change based on a driver model and a driver state, the behavior change includes at least one of a change in deceleration value or acceleration value, a change from a constant velocity to a constant acceleration at a future time, and a change from a constant acceleration to a constant velocity at the future time, the behavior change includes a delay based on a determined driver state, wherein the determined driver state includes one of an attentive state, a drowsy state, a surprised state, a distracted state, an expert driver state, an inexperienced state, and a disoriented state, predicting the at least one behavior and adapting the predicted at least one behavior includes a lateral behavior comprising a lane change, taking a left path, a straight path or a right path at an intersection, a swerving around a center line.

16. The computer-implemented method according to claim 1, wherein the method comprises estimating the risk includes estimating the risk associated with signaling the information on the determined at least one event to the agent and further associated with signaling the information on the determined at least one event to the at least one other agent, and generating and outputting the signal to the agent and a further signal to the at least one other agent in case of determining that outputting the signal and the further signal decreases the estimated risk.

17. The computer-implemented method according to claim 1, wherein the method comprises executing the computer-implemented method by the at least one processor collocated with the agent.

18. The computer-implemented method according to claim 1, wherein the method comprises executing the computer-implemented method in a distributed manner by the processors of at least two of the agents, of the at least one other agent, and of at least one server remote from the agent and the at least one other agent.

19. The computer-implemented method according to claim 1, wherein the method comprises transmitting information on the human factors and associated impact of the human factors on the predicted behavior to at least one of the at least one other agent and at least one remote server.

20. The computer-implemented method according to claim 1, wherein the method comprises executing the computer-implemented method in an advanced driver assistance system of an ego-vehicle.

21. The computer-implemented method according to claim 1, wherein the method comprises executing at least some steps of the computer-implemented method by a remote server remote to the agent.

22. The computer-implemented method according to claim 1, wherein the determined event is a predicted collision involving the agent or a near-collision involving the agent.

23. The computer-implemented method according to claim 1, wherein the at least one behavior includes at least one trajectory of at least one of the agent or the at least one other agent.

24. The computer-implemented method according to claim 1, wherein the at least one other agent includes at least one of a pedestrian, a cyclist, a motorcyclist, and a driver of a road vehicle in a road traffic environment.

* * * * *